US010442282B2

(12) United States Patent
Shinohara et al.

(10) Patent No.: US 10,442,282 B2
(45) Date of Patent: Oct. 15, 2019

(54) VEHICLE DRIVE SYSTEM

(71) Applicant: HONDA MOTOR CO., LTD., Tokyo (JP)

(72) Inventors: Sei Shinohara, Saitama (JP); Masatoshi Noguchi, Saitama (JP); Satoshi Andou, Saitama (JP); Makoto Tsuchihashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/667,162

(22) Filed: Aug. 2, 2017

(65) Prior Publication Data
US 2017/0349038 A1 Dec. 7, 2017

Related U.S. Application Data

(63) Continuation of application No. 13/723,962, filed on Dec. 21, 2012, now abandoned.

(30) Foreign Application Priority Data

Dec. 22, 2011 (JP) ................................. 2011-281854
Feb. 1, 2012 (JP) ................................. 2012-020110

(51) Int. Cl.
*B60K 1/02* (2006.01)
*B60L 7/14* (2006.01)
(Continued)

(52) U.S. Cl.
CPC .................................... *B60K 1/02* (2013.01);
*B60L 7/14* (2013.01); *B60L 7/26* (2013.01);
*B60L 15/2009* (2013.01);
(Continued)

(58) Field of Classification Search
CPC . B60K 6/52; B60K 6/448; B60K 6/24; B60K 6/383; B60K 1/02; B60W 40/114;
(Continued)

(56) References Cited

U.S. PATENT DOCUMENTS 5,372,213 A * 12/1994 Hasebe .................... B60K 1/02
180/65.6
6,008,606 A 12/1999 Arai et al.
(Continued)

FOREIGN PATENT DOCUMENTS

CN    101454188 A    6/2009
CN    101456417 A    6/2009
(Continued)

OTHER PUBLICATIONS

Japanese Office Action dated May 13, 2014, issued in corresponding Japanese Patent Application No. 2013-145676 (2 pages).
(Continued)

*Primary Examiner* — Tinh T Dang
(74) *Attorney, Agent, or Firm* — Westerman, Hattori, Daniels & Adrian, LLP

(57) ABSTRACT

A vehicle drive system includes a left-wheel drive unit having a first motor and a first transmission, a right-wheel drive unit having a second motor and a second transmission, and a motor control unit. Each of the first and second transmissions has a first to third rotational elements. The first motor is connected to the first rotational element of the first transmission. The second motor is connected to the first rotational element of the second transmission. The left wheel is connected to the second rotational element of the first transmission. The right wheel is connected to the second rotational element of the second transmission. The third rotational element of the first transmission and the third rotational element of the second transmission are coupled to (Continued)

each other. Each of the first and second transmissions has a fourth rotational element which is supported to revolve around by the second rotational element.

6 Claims, 23 Drawing Sheets

(51) Int. Cl.

| | | |
|---|---|---|
| *B60L 7/26* | (2006.01) | |
| *B60L 11/14* | (2006.01) | |
| *B60L 15/20* | (2006.01) | |
| *B60K 6/52* | (2007.10) | |
| *B60K 6/448* | (2007.10) | |
| *B60K 6/24* | (2007.10) | |
| *B60K 6/383* | (2007.10) | |
| *B60L 50/61* | (2019.01) | |
| *B60L 50/16* | (2019.01) | |
| *B60L 58/12* | (2019.01) | |
| *B60L 50/60* | (2019.01) | |

(52) U.S. Cl.
CPC ....... *B60L 15/2036* (2013.01); *B60L 15/2054* (2013.01); *B60L 50/16* (2019.02); *B60L 50/61* (2019.02); *B60L 50/66* (2019.02); *B60L 58/12* (2019.02); *B60L 2210/40* (2013.01); *B60L 2220/46* (2013.01); *B60L 2220/50* (2013.01); *B60L 2240/12* (2013.01); *B60L 2240/24* (2013.01); *B60L 2240/421* (2013.01); *B60L 2240/423* (2013.01); *B60L 2240/461* (2013.01); *B60L 2240/485* (2013.01); *B60L 2240/486* (2013.01); *B60L 2250/26* (2013.01); *B60L 2260/28* (2013.01); *B60L 2270/145* (2013.01); *Y02T 10/6217* (2013.01); *Y02T 10/641* (2013.01); *Y02T 10/645* (2013.01); *Y02T 10/646* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10T 477/23* (2015.01)

(58) Field of Classification Search
CPC ....... B60W 2510/081; B60W 2510/083; B60L 7/14; B60L 7/26; B60L 11/123; B60L 11/14; B60L 11/1861; B60L 11/1877; B60L 15/2009; B60L 15/2036; B60L 15/2054; B60L 2240/485; B60L 2240/12; B60L 2210/40; B60L 2240/24; B60L 2240/421; B60L 2220/50; B60L 2240/461; B60L 2220/46; B60L 2240/486; B60L 2250/26; B60L 2260/28; B60L 2270/145; B60L 2240/423; Y02T 10/646; Y02T 10/6217; Y02T 10/7275; Y02T 10/645; Y02T 10/7241; Y02T 10/705; Y02T 10/7005; Y02T 10/7044; Y02T 10/7077; Y02T 10/641; Y10T 477/23

See application file for complete search history.

(56) References Cited

U.S. PATENT DOCUMENTS

| | | | |
|---|---|---|---|
| 6,024,182 A | 2/2000 | Hamada et al. | |
| 6,105,704 A | 8/2000 | Hamada et al. | |
| 6,321,865 B1 | 11/2001 | Kuribayashi et al. | |
| 6,325,736 B1 | 12/2001 | Hamada et al. | |
| 6,349,782 B1 | 2/2002 | Sekiya et al. | |
| 6,580,874 B1 | 6/2003 | Sekiya et al. | |
| 7,727,100 B2 * | 6/2010 | Bucknor ................ | B60K 6/445 180/65.21 |
| 2003/0037977 A1 | 2/2003 | Tatara et al. | |
| 2004/0056633 A1 | 3/2004 | Sugiura et al. | |
| 2006/0108166 A1 | 5/2006 | Tanaka et al. | |
| 2006/0162972 A1 | 7/2006 | Hoshiba et al. | |
| 2006/0289210 A1 | 12/2006 | Yoshimi | |
| 2007/0007939 A1 | 1/2007 | Miller et al. | |
| 2007/0255463 A1 | 11/2007 | Kikuchi | |
| 2009/0036246 A1 | 2/2009 | Bucknor et al. | |
| 2009/0038866 A1 | 2/2009 | Abe et al. | |
| 2009/0088914 A1 | 4/2009 | Mizutani et al. | |
| 2009/0093940 A1 | 4/2009 | Ichimoto et al. | |
| 2009/0292449 A1 | 11/2009 | Yamazaki et al. | |
| 2013/0260936 A1 | 10/2013 | Takei et al. | |

FOREIGN PATENT DOCUMENTS

| | | |
|---|---|---|
| DE | 19680744 B4 | 2/2011 |
| EP | 1701061 A1 | 9/2006 |
| JP | 09-079348 | 3/1997 |
| JP | 3138799 B2 | 2/2001 |
| JP | 2003-139225 A | 5/2003 |
| JP | 2004-40975 A | 2/2004 |
| JP | 2009-107425 A | 5/2009 |
| JP | 2011-225161 A | 11/2011 |

OTHER PUBLICATIONS

Office Action dated Mar. 30, 2015, issued in corresponding Chinese Application No. 201210559203.5, w/ partial English translation. (8 pages).

Office Action dated Jul. 23, 2019 issued in counterpart DE application No. 102012224186.8. (7 pages).

* cited by examiner

FIG. 4

| VEHICLE STATES | FRONT UNIT | REAR UNIT | REAR MOTORS | OWC | BRK |
|---|---|---|---|---|---|
| STOPPED | × | × | STOPPED | OFF | OFF |
| TRAVELING FORWARDS AT LOW VEHICLE SPEEDS | × | ○ | POWER DRIVE | ON | ON (WEAKLY APPLIED) |
| TRAVELING FORWARDS AT MIDDLE VEHICLE SPEEDS | ○ | × | STOPPED | OFF | ON (WEAKLY APPLIED) |
| REGENERATIVE DECELERATION | ○ | ○ | REGENERATIVE DRIVE | OFF | ON |
| ACCELERATED | ○ | ○ | POWER DRIVE | ON | ON (WEAKLY APPLIED) |
| TRAVELING FORWARDS AT HIGH VEHICLE SPEEDS (WITHOUT REQUEST FOR YAWING MOMENT) | ○ | × | STOPPED | OFF | OFF |
| TRAVELING FORWARDS AT HIGH VEHICLE SPEEDS (WITH REQUEST FOR YAWING MOMENT) | ○ | LEFT AND RIGHT OPPOSITE CONTROL | POWER DRIVE/ REGENERATIVE DRIVE | OFF | OFF |
| REVERSING | × | ○ | REVERSED POWER DRIVE | OFF | ON |

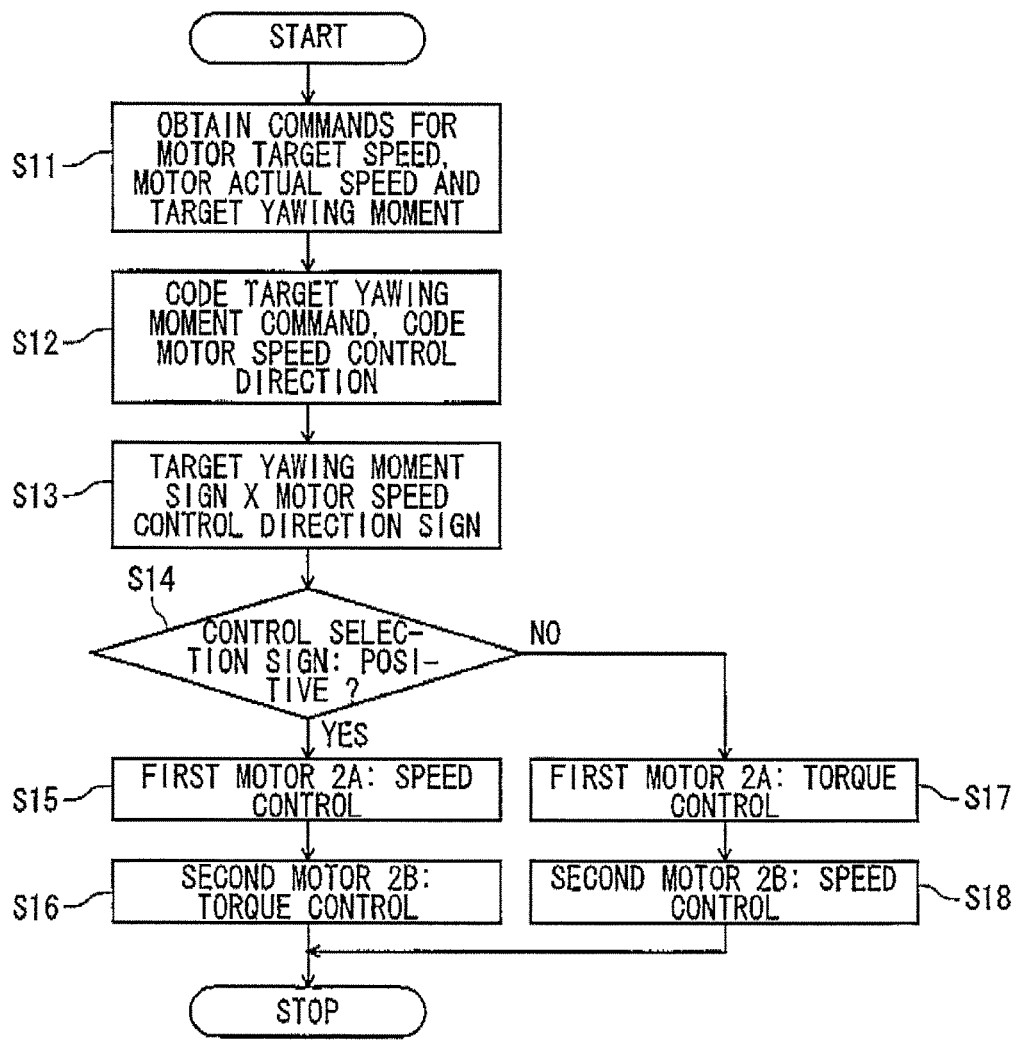

FIG. 17

| YAWING MOMENT COMMAND SIGH | MOTOR SPEED CONTROL DIRECTION SIGN | YAWING MOMENT COMMAND SIGN X MOTOR SPEED CONTROL DIRECTION SIGN (CONTROL SELECTION SIGN) | FIRST MOTOR 2A | FIRST MOTOR 2B |
|---|---|---|---|---|
| CLOCKWISE ↓ POSITIVE | UPWARD ↓ POSITIVE | POSITIVE | SPEED CONTROL | TORQUE CONTROL |
| CLOCKWISE ↓ POSITIVE | DOWNWARD ↓ NEGATIVE | NEGATIVE | TORQUE CONTROL | SPEED CONTROL |
| COUNTER-CLOCKWISE ↓ NEGATIVE | UPWARD ↓ POSITIVE | NEGATIVE | TORQUE CONTROL | SPEED CONTROL |
| COUNTER-CLOCKWISE ↓ NEGATIVE | DOWNWARD ↓ NEGATIVE | POSITIVE | SPEED CONTROL | TORQUE CONTROL |

FIG. 18
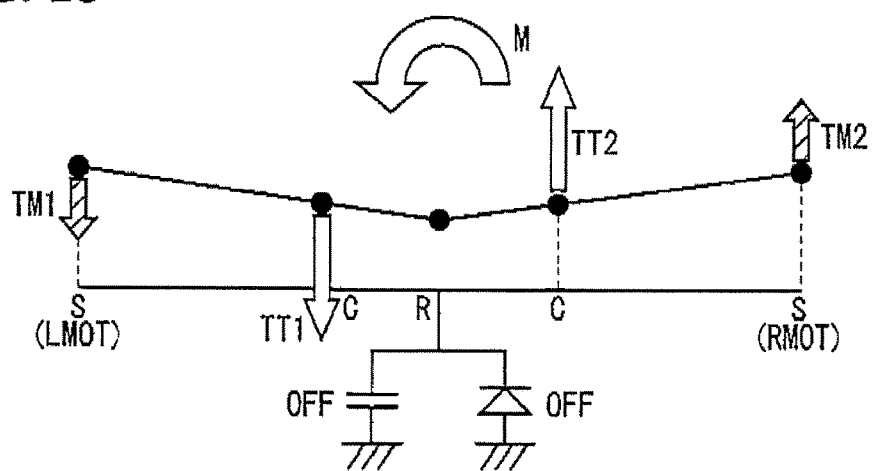
(a)
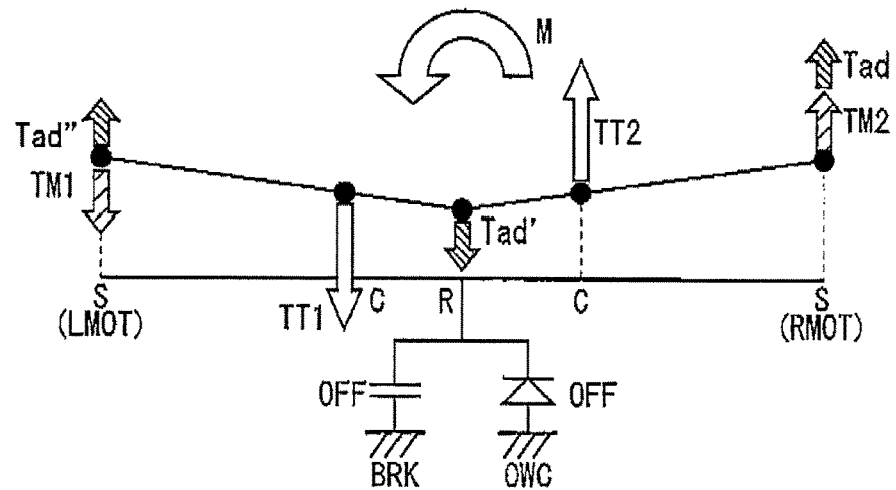
(b)
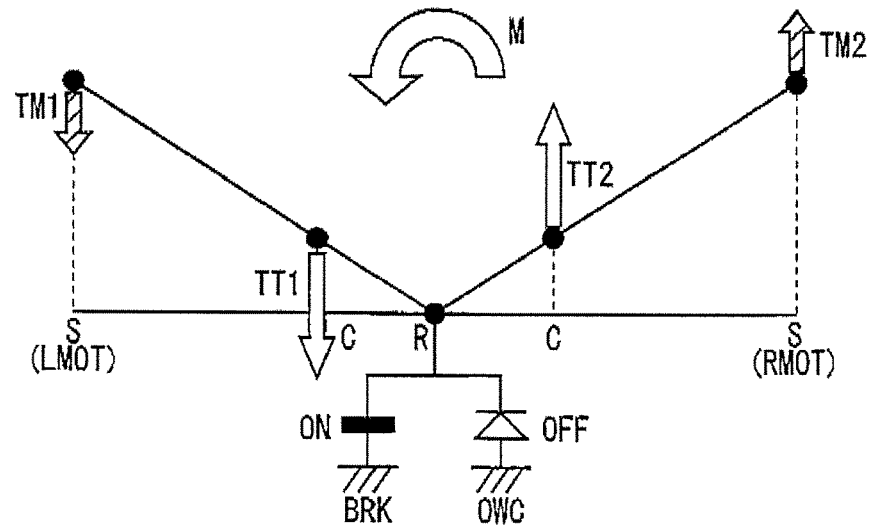
(c)

FIG. 21
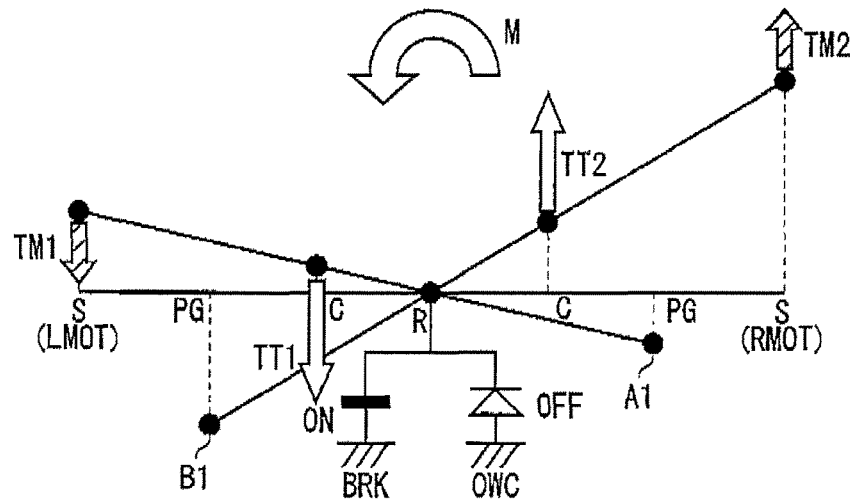
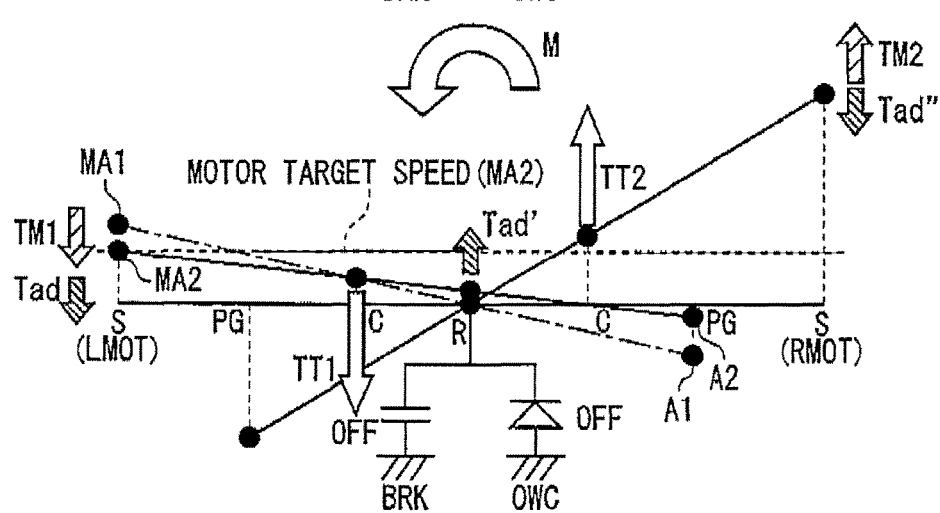
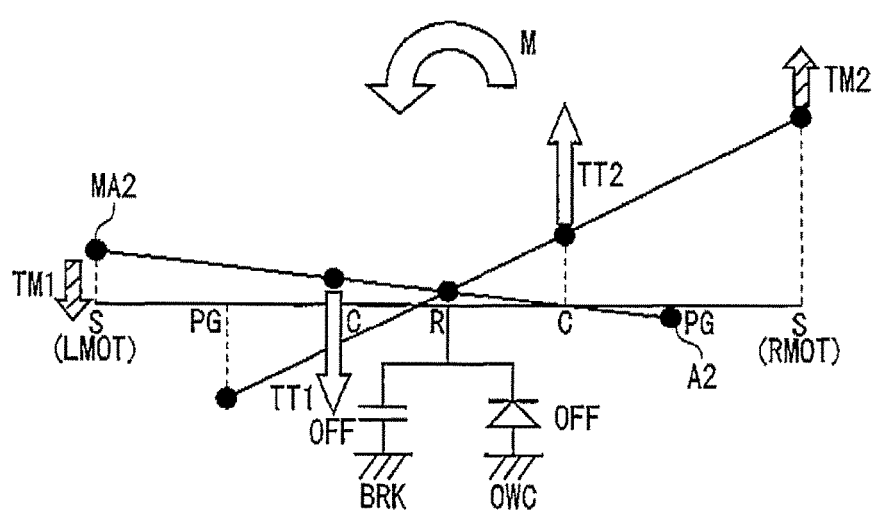

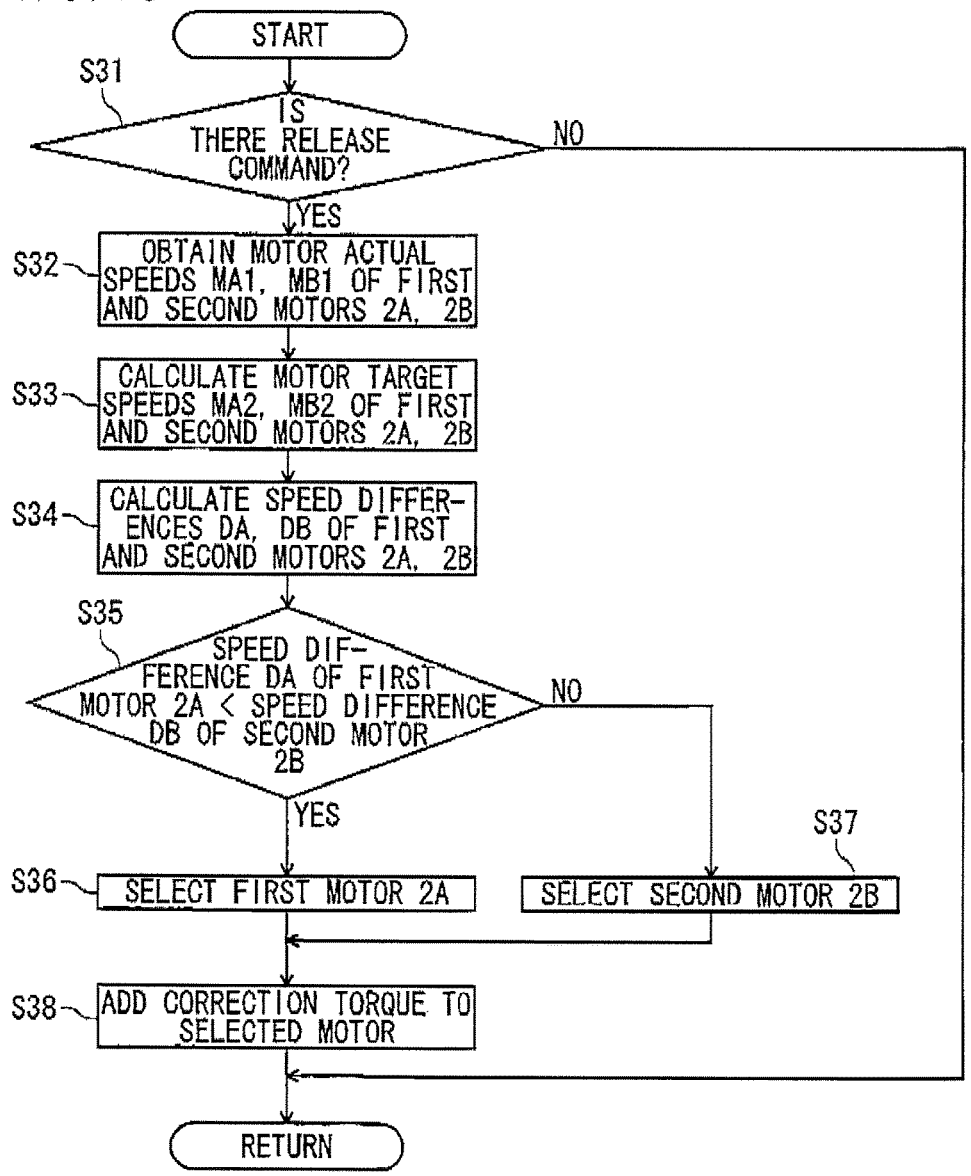

VEHICLE DRIVE SYSTEM

CROSS-REFERENCE TO RELATED APPLICATION(S)

This application is a continuation of U.S. application Ser. No. 13/723,962, filed on Dec. 21, 2012 which is based upon and claims priority/priorities from Japanese Patent Application Nos. 2011-281854 filed on Dec. 22, 2011 and 2012-020110 filed on Feb. 1, 2012, the entire contents of which are incorporated herein by reference.

FIELD

The present invention relates to a vehicle drive system in which a left wheel drive system for driving a left wheel and a right wheel driving system for driving a right wheel are provided.

BACKGROUND

JP-3138799-B describes a vehicle drive system that includes a left-wheel drive unit having a first motor for driving a left wheel of a vehicle and a first epicyclic transmission that is provided on a power transmission line between the first motor and the left wheel and a right-wheel drive unit having a second motor for driving a right wheel of the vehicle and a second epicyclic transmission that is provided on a power transmission line between the second motor and the right wheel. In the first and second epicyclic transmissions, the first and second motors are individually connected to sun gears, and the left and right wheels are individually connected to planetary carriers, ring gears being coupled to each other. Brake devices are provided for controlling the rotation of the ring gears by bringing the coupled ring gears into disengagement from or engagement with each other.

In the above-described vehicle drive system, a start assist control is executed when the vehicle is started by applying the brake devices. Further, after the vehicle is started, by executing a left and right opposite torque control so that the first and second motors produce torque in opposite directions with the brake devices released, even when a yawing moment is applied to the vehicle by disturbance, a moment that is opposite to the yawing moment is produced so as to increase the straight line and turning vehicle stabilities.

In recent years, there are strong demands for energy saving and improved fuel economy. In the vehicle drive system of JP-3138799-B, there is still room for improvement.

SUMMARY

One object thereof is to provide a vehicle drive system that enables energy saving and an improvement in fuel economy by controlling either of first and second motors to attain its target speed while producing a desired yawing moment when a left and right opposite torque control is executed.

The first aspect of the present invention defines a vehicle drive system, including:
a left-wheel drive unit having
a first motor for driving a left wheel of a vehicle and
a first transmission that is provided on a power transmission line between the first motor and the left wheel;
a right-wheel drive unit having
a second motor for driving a right wheel of the vehicle and
a second transmission that is provided on a power transmission line between the second motor and the right wheel; and
a motor control unit for controlling the first motor and the second motor,
wherein the first and second transmissions each has a first to third rotational elements,
wherein the first motor is connected to the first rotational element of the first transmission,
wherein the second motor is connected to the first rotational element of the second transmission,
wherein the left wheel is connected to the second rotational element of the first transmission,
wherein the right wheel is connected to the second rotational element of the second transmission,
wherein the third rotational element of the first transmission and the third rotational element of the second transmission are coupled to each other, and
wherein the first and second transmissions each further has a fourth rotational element which are supported so as to revolve around by the second rotational element while meshing with the first rotational element and the third rotational element,
wherein the motor control unit is configured to:
to control the first motor based on a first target revolution state quantity of the first transmission which is induced so that a rotating direction of the fourth rotational element of the first transmission rotating in one direction or an other direction is not reversed, and/or
to control the second motor based on a second target revolution state quantity of the second transmission which is induced so that a rotating direction the fourth rotational element of the second transmission rotating in one direction or an other direction is not reversed,
to thereby control the first motor and the second motor such that the rotating direction of the fourth rotational element of the first transmission and/or the rotating direction of the fourth rotational element of the second transmission are/is not reversed.

The first aspect of the present invention further defines, the system
wherein there is further provided a connection/disconnection unit that can be released or applied and which slows a rotation of the third rotational elements by being applied,
wherein the motor control unit controls the first motor and the second motor further based on a target revolution state quantity of the coupled third rotational elements, and
wherein, when the connection/disconnection unit is released, the target rotation state quantity of the third rotational elements is set so that the third rotational elements are put in a substantially zero rotation state, and the connection/disconnection unit is applied when the third rotational elements are put in the substantially zero rotation state.

The first aspect of the present invention further defines, the system
wherein there is further provided a rotational-direction restriction unit that permits a rotation of the third rotational elements in one direction based on backward torque of the first and second motors when disengaged, and which restricts a rotation of the third rotational elements in an other direction based on forward torque of the first and second motors when engaged, and
wherein the motor control unit controls the first motor and the second motor so that the rotating direction of the fourth rotation element rotating in the one direction is not reversed as a result of non-engagement of the rotational-direction restriction unit.

The first aspect of the present invention further defines, the system
wherein the motor control unit controls the first motor and the second motor so that the third rotational elements are put in a substantially zero rotation state rotating in the one direction as a result of non-engagement of the rotational-direction restriction unit.

The first aspect of the present invention further defines, the system
wherein the first and second transmissions are planetary gear mechanisms, and
wherein the first rotational elements are sun gears, the second rotational elements are carriers, the third rotational elements are ring gears, and the fourth rotational elements are planetary gears.

The first aspect of the present invention further defines, the system
wherein the motor control unit is configured to:
to control the first motor based on the first target revolution state quantity of the first transmission which is induced so that the rotating direction of the fourth rotational element of the first transmission rotating in the one direction or the other direction is not reversed,
to control the second motor based on the second target revolution state quantity of the second transmission which is induced so that the rotating direction the fourth rotational element of the second transmission rotating in the one direction or the other direction is not reversed, and
to control the first motor and the second motor such that the rotating direction of the fourth rotational element of the first transmission and the rotating direction of the fourth rotational element of the second transmission are not reversed by satisfying either one of the first target revolution state quantity and the second target revolution state quantity if both of them cannot be satisfied.

According to the first aspect of the present invention, by executing the left and right opposite torque control in which the first motor and the second motor produce the torque in the opposite directions, even when the third rotational elements are not locked, left and right opposite torque can be produced in the left and right wheels so as to produce an initial yawing moment. Further, either of the first and second motors can be controlled to attain its target speed. By so doing, it is possible to realize energy saving and an improvement in fuel economy.

According to the first aspect of the invention, it is possible to reduce the consumed electric power by obtaining the target revolution state quantity of the one motor based on the efficiency of the one motor and/or the electric power supply unit. In other words, by making use of the advantage that an arbitrary speed can be attained, it is possible to realize a state where the consumed electric power becomes least.

According to the first aspect of the invention, since the efficiencies of the motor and the electric power converter occupy a large portion of the efficiency of the electric power supply system, it is possible to reduce the consumed electric power more by obtaining the target revolution state quantity of the one motor based on the efficiencies of both the motor and the electric power converter.

According to the first aspect of the invention, when obtaining efficiency in an experimental fashion, the preparation of an efficiency map is facilitated, and when obtaining efficiency through sequential detection and estimation, it is possible to reduce a control quantity.

According to the first aspect of the invention, a desired rotation state quantity can be produced in the third rotational elements, and it is possible to put the third rotational elements in a state where the rotational loss is small.

According to the first aspect of the invention, by slowing the third rotational elements by applying the connection/disconnection unit, it is possible to transmit the torque in the same direction of the first and second motors to the wheels.

According to the first aspect of the invention, by applying the connection/disconnection unit when the rotation speed of the third rotational elements is reduced to the substantially zero rotation state, it is possible to reduce the shock at the time of application of the connection/disconnection unit and the deterioration thereof.

According to the first aspect of the invention, by providing the rotational-direction restriction unit on the third rotational elements, it is possible to transmit mechanically the forward torque of the first and second motors to the wheels without consuming energy for application of the connection/disconnection unit.

According to the first aspect of the invention, with the rotational-direction restriction unit disengaged, it is possible to realize a state where the rotational loss of the third rotational elements is small.

According to the first aspect of the invention, since a shock is transmitted to the wheels when the rotational-direction restriction unit is engaged, the rotation in one way is maintained to thereby avoid the engagement of the rotational-direction restriction unit, thereby making it possible to suppress the shock produced when the rotational-direction restriction unit is engaged.

According to the first aspect of the invention, since the target revolution state quantity of the one motor is obtained based on the rotations of the second rotational elements or the wheels in addition to the target rotation state quantity of the third rotational elements, it is possible to control the rotation of the third rotational elements more accurately.

According to the first aspect of the invention, since the target torque state quantity of the other motor is obtained based on the target turning state quantity of the vehicle, it is possible to increase the turning performance of the vehicle.

According to the first aspect of the invention, by making the target torque state quantity half the target torque difference between the first motor and the second motor, it is possible to put the vehicle in its target turning state in an ensured fashion.

According to the first aspect of the invention, by controlling the absolute value of the torque of the one motor that is controlled based on the target revolution state quantity to be larger than the absolute value of the torque of the other motor, it is possible to transmit the torque of the other motor that is controlled based on the target torque state quantity to the wheels at all times, whereby the yawing moment of the vehicle is not changed, thereby making it possible to stabilize the behaviors of the vehicle.

According to the first aspect of the invention, the torque that increases the speeds of the motors is torque in the forward direction, and in the event that the forward torque is applied to the motor that is producing torque in the backward direction, the torque in the forward direction is cancelled by the torque in the backward direction or vise versa. Therefore, by adding the correction torque to the motor of the first and second motors that is producing the forward torque when the target revolution state quantity of the one motor is higher than the target revolution state quantity of the other motor, it is possible to suppress the cancellation of the torques.

According to the first aspect of the invention, it is possible to control the rotational state of the fourth rotational elements that mesh with the first and third rotational elements as required.

According to the first aspect of the invention, it is possible to prevent the generation of a backlash due to a reverse of the rotational direction of the fourth rotational elements, thereby making it possible to prevent a disturbance in torque produced in the wheels that would otherwise be generated due to the backlash.

According to the first aspect of the invention, by causing the prevention of generation of a backlash to take priority over the efficiency of the motor, it is possible to increase the comfortableness in the vehicle.

According to the first aspect of the invention, by causing the control of the rotating state of the third rotational elements to take priority over the prevention of generation of a backlash, it is possible to prevent the occurrence of a shock as when the connection/disconnection unit is applied or released in an ensured fashion, thereby making it possible to increase the stability of the vehicle.

According to the first aspect of the invention, by using the general-purpose planetary gear mechanisms, it is possible to reduce the costs.

BRIEF DESCRIPTION OF DRAWINGS

FIG. 4 is a table depicting a relation between a front-wheel drive system and the rear-wheel drive system in various vehicle states together with operating states of motors.

FIG. 16 is a flowchart depicting a flow of the left and right opposite torque control of the first embodiment.

FIG. 17 is a chart depicting yawing moment command signs and motor speed control direction signs.

FIG. 18 shows speed collinear diagrams of a left and right opposite torque control of the rear-wheel drive system according to a second embodiment in a time-series fashion, in which (a) is a speed collinear diagram depicting a balanced state, (b) is a speed collinear diagram depicting a state where a revolution matching is executed, and (c) is a speed collinear diagram depicting a state where hydraulic brakes are applied.

FIG. 21 shows speed collinear diagrams of a left and right opposite torque control of the rear-wheel drive system according to a third embodiment in a time-series fashion, in which (a) is a speed collinear diagram depicting a state where the hydraulic brakes are applied, (b) is a speed collinear diagram depicting a state where a revolution matching is executed, and (c) is a speed collinear diagram depicting a balanced state.

FIG. 23 is a flowchart depicting a flow of the left and right opposite torque control according to the third embodiment.

DETAILED DESCRIPTION

Firstly, one embodiment of a vehicle drive system will be described based on FIGS. 1 to 3.

Figure 1:
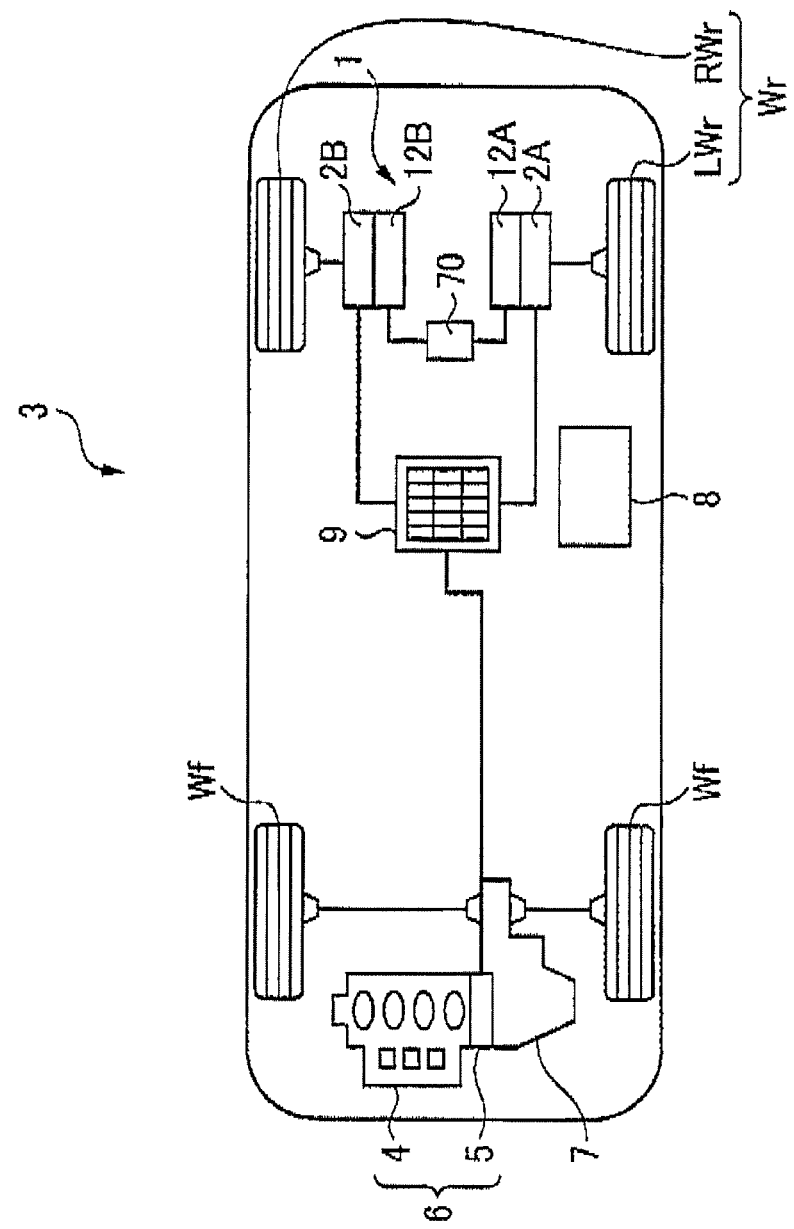
FIG. 1 is a block diagram showing a schematic configuration of a hybrid vehicle in which a vehicle drive system according to embodiments can be mounted.

The vehicle drive system according to the embodiment is such as to use motors as drive sources for driving axles and is used in a vehicle that incorporates, for example, a drive system as shown in FIG. 1. In the following description, the vehicle drive system will be described as being used as a rear-wheel drive system. However, the vehicle drive system may be used for a front-wheel drive system.

A vehicle 3 shown in FIG. 1 is a hybrid vehicle having a drive system 6 (hereinafter, referred to as a front-wheel drive system) in which an internal combustion engine 4 and a motor 5 are connected in series at a front part of the vehicle. Power of this front-wheel drive system 6 is transmitted to front wheels Wf via a transmission 7, while power of a drive system 1 (hereinafter, referred to as a rear-wheel drive system) that is provided at a rear part of the vehicle separately from the front-wheel drive system 6 is designed to be transmitted to rear wheels Wr (RWr, LWr). The motor 5 of the front-wheel drive system 6 and first and second motors 2A, 2B of the rear-wheel drive system 1 on a rear wheel Wr side are connected to a battery 9, so that an electric power supply from the battery 9 and energy regeneration to the battery 9 are enabled. Reference numeral 8 is a control unit for controlling variously the whole of the vehicle.

Figure 2:
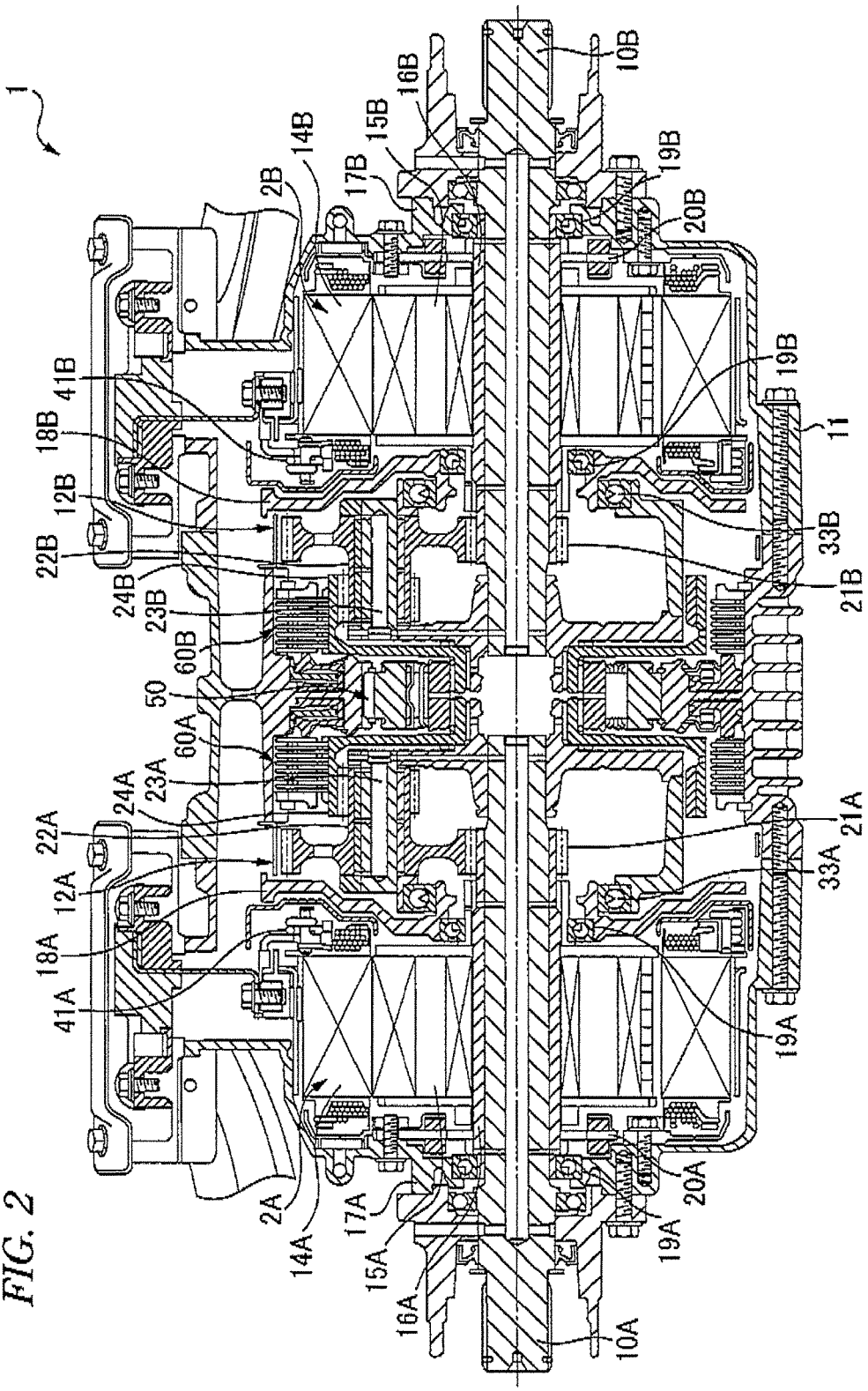
FIG. 2 is a vertical sectional view of a rear-wheel drive system.
Figure 3:
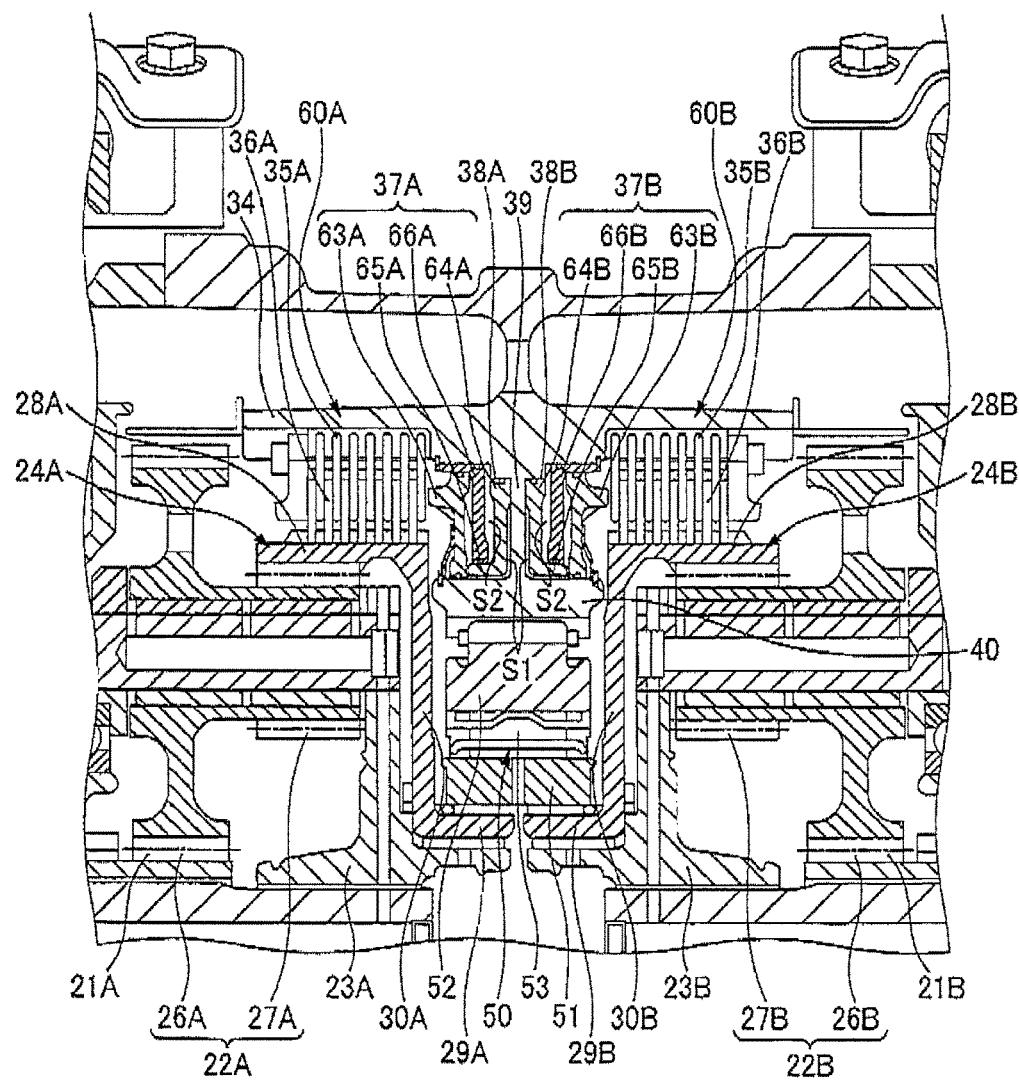
FIG. 3 is a partially enlarged view of the rear-wheel drive system shown in FIG. 2.

FIG. 2 is an overall vertical sectional view of the rear-wheel drive system 1. In the same figure, reference numerals 10A, 10B denote left and right axles of the rear wheels Wr of the vehicle 3, and the left and right axles are disposed coaxially in a width direction of the vehicle. A reduction gear case 11 of the rear-wheel drive system 1 is formed into a substantially cylindrical shape in whole. The first and second axle driving motors 2A, 2B and first and second epicyclic reduction gears 12A, 12B that decrease the speed of driving revolutions of the first and second motors 2A, 2B are disposed concentrically with the axles 10A, 10B in an interior of the reduction gear case 11. The first motor 2A and the first epicyclic reduction gear 12A function as a left-wheel drive unit for driving a left rear wheel LWr, and the second motor 2B and the second epicyclic reduction gear 12B function as a right-wheel drive unit for driving a right rear wheel RWr. The first motor 2A and the first epicyclic reduction gear 12A and the second motor 2B and the second epicyclic reduction gear 12B are disposed symmetric laterally in the width direction within the reduction gear case 11.

Stators 14A, 14B of the first and second motors 2A, 2B are fixed to insides of both left and right end portions of the reduction gear case 11, and annular rotors 15A, 15B are disposed rotatably on inner circumferential sides of the stators 14A, 14B. Cylindrical shafts 16A, 16B that surround outer circumferences of the axles 10A, 10B are connected to inner circumferential portions of the rotors 15A, 15B. These cylindrical shafts 16A, 16B are supported on end walls 17A, 17B and intermediate walls 18A, 18B of the reduction gear case 11 via bearings 19A, 19B so as to rotate relative to and concentric with the axles 10A, 10B. Resolvers 20A, 20B that feed information on rotational positions of the rotors 15A, 15B back to a controller (not shown) for controlling the first and second motors 2A, 2B are provided on outer circumferences of one end portions of the cylindrical shafts 16A, 16B and on the end walls 17A, 17B of the reduction gear case 11.

The first and second epicyclic reduction gears 12A, 12B include sun gears 21A, 21B, plural planetary gears 22A, 22B that are caused to mesh with the sun gears 21, planetary carriers 23A, 23B that support these planetary gears 22A, 22B and ring gears 24A, 24B that are caused to mesh with outer circumferential sides of the planetary gears 22A, 22B. Driving forces of the first and second motors 2A, 2B are inputted into the first and second epicyclic reduction gears 12A, 12B from the sun gears 21A, 21B and the decelerated driving forces are outputted therefrom through the planetary carriers 23A, 23B.

The sun gears 21A, 21B are formed integrally with the cylindrical shafts 16A, 16B. For example, as shown in FIG. 3, the planetary gears 22A, 22B are double pinions that have first pinions 26A, 26B that are larger in diameter and which are caused to mesh directly with the sun gears 21A, 21B and second pinions 27A, 27B that are smaller in diameter than the first pinions 26A, 26B, and the first pinions 26A, 26B and the second pinions 27A, 27B are formed integrally in such a manner that the first and second pinions are concentric and are offset in an axial direction. The planetary gears 22A, 22B are supported by the planetary carriers 23A, 23B. Axially inner end portions of the planetary carriers 23A, 23B extend radially inwards and spline fit on the axles 10A, 10B, whereby the planetary carriers 23A, 23B are supported on the axles 10A, 10B so as to rotate together therewith. The planetary carriers 23A, 23B are also supported on the intermediate walls 18A, 18B via bearings 33A, 33B.

The intermediate walls 18A, 18B divide motor accommodating spaces where the first and second motors 2A, 2B are accommodated and reduction gear spaces where the first and second epicyclic reduction gears 12A, 12B are accommodated and are bent so that an axial space defined therebetween expands from a radially outer side to a radially inner side. Then, the bearings 33A, 33B that support the planetary carriers 23A, 23B are disposed on radially inner sides of the intermediate walls 18A, 18B and on sides thereof which face the first and second epicyclic reduction gears 12A, 12B, and bus rings 41A, 41B for the stators 14A, 14B are disposed on radially outer sides of the intermediate walls 18A, 18B and sides thereof which face the first and second motors 2A, 2B (refer to FIG. 2).

The ring gears 24A, 24B include gear portions 28A, 28B that mesh with the second pinions 27A, 27B which are smaller in diameter on inner circumferential surfaces thereof, small-diameter portions 29A, 29B that are smaller in diameter than the gear portions 28A, 28B and which are disposed so as to face oppositely each other in an intermediate position of the reduction gear case 11 and connecting portions 30A, 30B that connect axially inner end portions of the gear portions 28A, 28B with axially outer end portions of the small-diameter portions 29A, 29B in a radial direction. In the case of this embodiment, maximum radii of the ring gears 24A, 24B are set so as to be smaller than maximum distances of the first pinions 26A, 26B from centers of the axles 10A, 10B. Both the small-diameter portions 29A, 29B spline fit on an inner race 51 of a one-way clutch 50, which will be described later, and the ring gears 24A, 24B rotates together with the inner race 51 of the one-way clutch 50.

Incidentally, a cylindrical space portion is secured between the reduction gear case 11 and the ring gears 24A, 24B. Then, hydraulic brakes 60A, 60B, which are configured as brake units for the ring gears 24A, 24B, are disposed in the space portion so as to overlap the first pinions 26A, 26B in the radial direction and overlap the second pinions 27A, 27B in the axial direction. In the hydraulic brakes 60A, 60B, plural fixed plates 35A, 35B that spline fit on an inner circumferential surface of a cylindrical, radially outside support portion 34 that extends in the axial direction on a radially inner side of the reduction gear case 11 and plural rotational plates 36A, 36B that spline fit on outer circumferential surfaces of the ring gears 24A, 24B are disposed alternately in the axial direction, and these plates 35A, 35B, 36A, 36B are operated to be engaged with and disengaged from each other by annular pistons 37A, 37B. The pistons 37A, 37B are accommodated in a reciprocating fashion in annular cylinder compartments 38A, 38B that are formed between a horizontally dividing wall 39 that extends radially inwards from the intermediate position of the reduction gear case 11 so as to divide horizontally the interior of the reduction gear case 11 into left and right portions, the radially outside support portion 34 and a radially inside support portion 40 which are connected with each other by the horizontally dividing wall 39. The pistons 37A, 37B are caused to advance by introducing highly pressurized oil into the cylinder compartments 38A, 38B, while the pistons 37A, 37B are withdrawn by discharging the oil from the cylinder compartments 38A, 38B. The hydraulic brakes 60A, 60B are connected to an electric oil pump 70 (refer to FIG. 1).

More specifically, the pistons 37A, 37B have first piston walls 63A, 63B and second piston walls 64A, 64B which are disposed forward and rearward of each other in the axial direction. These piston walls 63A, 63B, 64A, 64B are connected together by cylindrical inner circumferential walls 65A, 65B. Consequently, annular spaces that are opened radially outwards are formed between the first piston walls 63A, 63B and the second piston walls 64A, 64B, and these annular spaces are partitioned axially horizontally by partition members 66A, 66B that are fixed to inner circumferential surfaces of outer walls of the cylinder compartments 38A, 38B. Spaces defined between the horizontally dividing wall 39 of the reduction gear case 11 and the second piston walls 64A, 64B are configured as first hydraulic chambers S1 into which highly pressurized oil is introduced directly, and spaces defined between the partition members 66A, 66B and the first piston walls 63A, 63B are configured as second hydraulic chambers S2 that communicate with the first hydraulic chambers S1 by way of through holes formed in the inner circumferential walls 65A, 65B. Spaces defined between the second piston walls 64A, 64B and the partition members 66A, 66B communicate with the atmospheric pressure.

In these hydraulic brakes 60A, 60B, oil is introduced into the first hydraulic chambers S1 and the second hydraulic chambers S2 from a hydraulic circuit 71, which will be described later, and the fixed plates 35A, 35B and the rotational plates 36A, 36B can be pressed against each other by virtue of the pressure of the oil that acts on the first piston walls 63A, 63B and the second piston walls 64A, 64B. Consequently, a large pressure bearing surface area can be obtained by the first and second piston walls 63A, 63B, 64A, 64B that are disposed forwards and rearwards of each other in the axial direction. Therefore, it is possible to obtain a large pressing force to be applied to the fixed plates 35A, 35B and the rotational plates 36A, 36B while suppressing an increase in radial surface area of the pistons 37A, 37B.

In the case of the hydraulic brakes 60A, 60B, the fixed plates 35A, 35B are supported on the radially outside support portion 34 that extends from the reduction gear case 11, while the rotational plates 36A, 36B are supported on the ring gears 24A, 24B. Therefore, when both the plates 35A, 35B, 36A, 36B are pressed against each other by the pistons 37A, 37B, a braking force is applied to the ring gears 24A, 24B to fix (lock) them in place by virtue of a frictional engagement attained between both the plates 35A, 35B and 36A, 36B. Then, when the engagement of the plates attained by the pistons 37A, 37B is released from that state, the ring gears 24A, 24B are permitted to rotate freely.

A space portion is secured between the connecting portions 30A, 30B of the ring gears 24A, 24B that face oppositely each other in the axial direction, and the one-way clutch 50 is disposed in the space portion, the one-way clutch 50 being adapted to transmit only power acting in one direction on the ring gears 24A, 24B and to cut off power acting in the other direction. The one-way clutch 50 is such that a number of sprags 53 are interposed between the inner race 51 and an outer race 52, and the inner race 51 spline fits on the small-diameter portions 29A, 29B of the ring gears 24A, 24B so as to rotate together therewith. The outer race 52 is positioned by the radially inside support portion 40 while being restricted from rotation. The one-way clutch 50 is brought into engagement when the vehicle 3 travels forwards based on the power of the first and second motors 2A, 2B so as to lock the rotation of the ring gears 24A, 24B. To describe this more specifically, the one-way clutch 50 is put in an engaged state when torque in a forward direction (a rotational direction when the vehicle 3 travels forwards) at the first and second motors 2A, 2B is inputted to the rear wheels Wr, while the one-way clutch 50 is put in a disengaged state when torque in a backward direction at first and second the motors 2A, 2B is inputted into the rear wheels Wr. The one-way clutch 50 is put in the disengaged state when forward torque at the rear wheels Wr is inputted into the first and second motors 2A, 2B, while the one-way clutch 50 is put in the engaged state when backward torque at the rear wheels Wr is inputted into the first and second motors 2A, 2B. In other words, when disengaged, the one-way clutch 50 permits a rotation of the ring gears 24A, 24B in one direction based on the backward torque of the first and second motors 2A, 2B, whereas when engaged, the one-way clutch 50 restricts a rotation of the ring gears 24A, 24B in the other or opposite direction based on the forward torque of the first and second motors 2A, 2B.

In this way, in the rear-wheel drive system 1 of this embodiment, the one-way clutch 50 and the hydraulic brakes 60A, 60B are provided in parallel on a power transmission line between the first and second motors 2A, 2B and the rear wheels Wr. The two hydraulic brakes 60A, 60B do not have to be provided, and therefore, a hydraulic brake is provided only for one of the first and second epicyclic reduction gears 12A, 12B and the remaining space may be used as a breather chamber.

Here, the control unit 8 (refer to FIG. 1) is a control unit for executing various controls in the whole vehicle. Vehicle speed, steering angle, accelerator pedal opening AP, gear position, SOC and oil temperature are inputted into the control unit 8, while outputted from the control unit 8 are a signal that controls the internal combustion engine 4, a signal that controls the first and second motors 2A, 2B, signals indicating a generating state, charging state and discharging state of the battery 9, and a control signal that controls the electric oil pump 70.

Namely, the control unit 8 includes at least a function as a motor control unit for controlling the first and second motors 2A, 2B.

FIG. 4 is a table depicting a relation between the front-wheel drive system 6 and the rear-wheel drive system 1 in various vehicle states together with operating states of the first and second motors 2A, 2B. In the figure, a front unit denotes the front-wheel drive system 6 and a rear unit denotes the rear-wheel drive system 1. Rear motors denote the first and second motors 2A, 2B. OWC denotes the one-way clutch 50, and BRK denotes the hydraulic brakes 60A, 60B. FIGS. 5 to 10, FIGS. 12 to 15, FIG. 18, FIG. 19, FIG. 21 and FIG. 22 depict speed collinear diagrams of the rear-wheel drive system 1 in the various states. In each of the figures, LMOT denotes the first motor 2A and RMOT denotes the second motor 2B. S, C and PG on a left-hand side denote the sun gear 21A of the first epicyclic reduction gear 12A coupled to the first motor 2A, the planetary carrier 23A coupled to the axle 10A, and the planetary gear 22A, respectively. S, C and PG on a right-hand side denote the sun gear 21B of the second epicyclic reduction gear 12B coupled to the second motor 2B, the planetary carrier 23B coupled to the axle 10B, and the planetary gear 22B, respectively. R denotes the ring gears 24A, 24B, BRK denotes the hydraulic brakes 60A, 60B and OWC denotes the one-way clutch 50. In the following description, the rotating direction of the sun gears 21A, 21B that are rotated by the first and second motors 2A, 2B when the vehicle travels forwards is referred to as a forward direction. In the figures, a portion above a line denoting a state where the vehicle is stopped denotes a forward rotation, whereas a portion below the line denotes a backward rotation. Arrows directed upwards denote forward torque, whereas arrows directed downwards denote backward torque.

Figure 5:
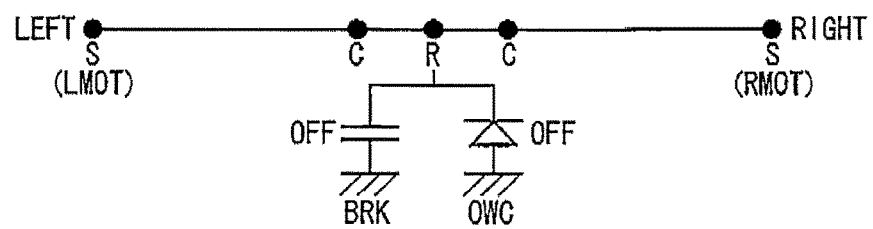
FIG. 5 is a speed collinear diagram of the rear-wheel drive system when the vehicle is stopped.

While the vehicle is stopped, neither the front-wheel drive system 6 nor the rear-wheel drive system 1 is driven. Consequently, as shown in FIG. 5, the first and second motors 2A, 2B of the rear-wheel drive system 1 are stopped, and the axles 10A, 10B are also stopped. Therefore, no torque acts on any of the elements. As this occurs, the hydraulic brakes 60A, 60B are released (OFF). Since the first and second motors 2A, 2B are not driven, the one-way clutch 50 is not engaged (OFF).

Figure 6:
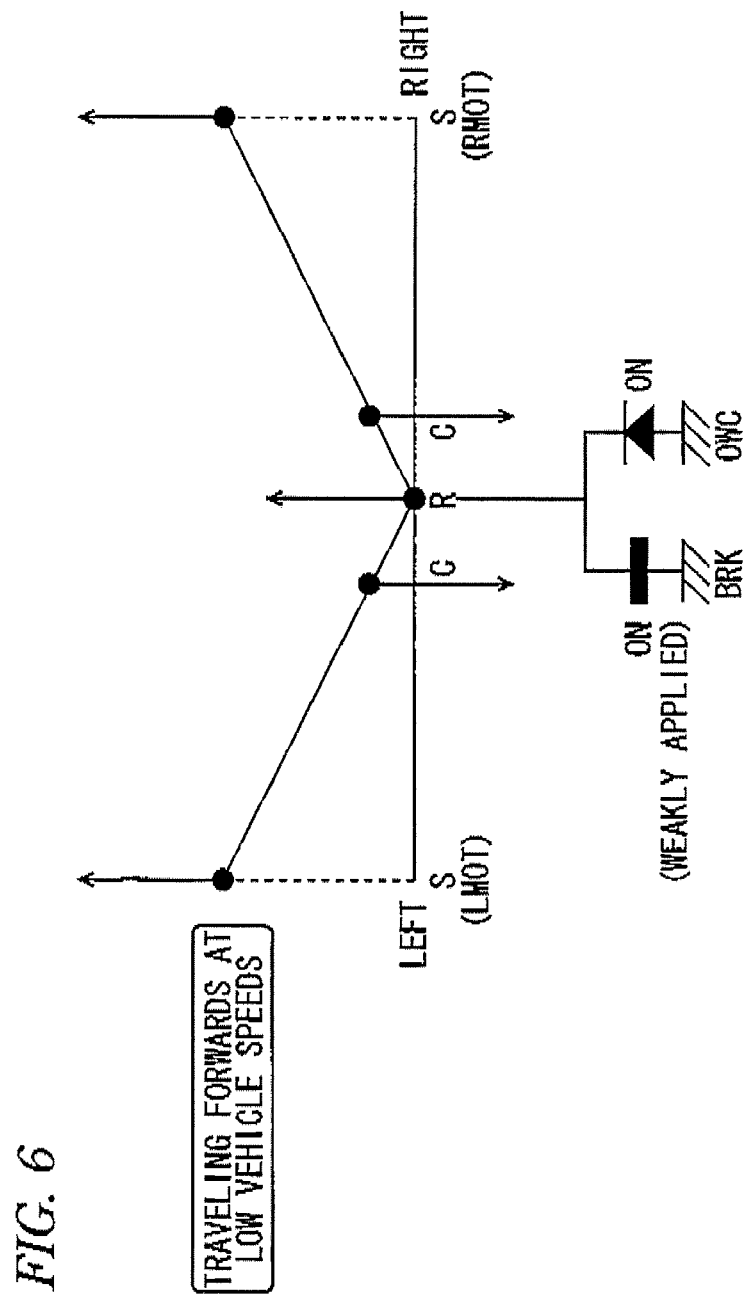
FIG. 6 is a speed collinear diagram of the rear-wheel drive system when the vehicle is traveling forwards at low vehicle speeds.

Then, while the vehicle is traveling forwards at low vehicle speeds by EV start and EV cruise with good motor efficiency after the key position is switched to an ON position, the vehicle is driven through rear-wheel drive by the rear-wheel drive system 1. As shown in FIG. 6, when the first and second motors 2A, 2B are power driven so as to rotate in the forward direction, forward torque is added to the sun gears 21A, 21B. As this occurs, as described above, the one-way clutch 50 is engaged, and the ring gears 24A, 24B are locked. By so doing, the planetary carriers 23A, 23B rotate in the forward direction, whereby the vehicle is allowed to travel forwards. A running resistance from the axles 10A, 10B act on the planetary carries 23A, 23B in the backward direction. In this way, when the vehicle 3 is started, the key position is switched to the ON position and the torque at the first and second motors 2A, 2B is increased, whereby the one-way clutch 50 is engaged mechanically, and the ring gears 24A, 24B are locked.

As this occurs, the hydraulic brakes 60A, 60B are controlled to be put in a weakly applied state. The weak application means a state where although power can be transmitted, the hydraulic brakes 60A, 60B are applied with a weaker application force than an application force with which the hydraulic brakes 60A, 60B are applied normally. When forward torque at the first and second motors 2A, 2B is inputted into the rear wheels Wr, the one-way clutch 50 is put in an engaged state, and the power transmission is enabled only by the one-way clutch 50. However, by keeping the hydraulic brakes 60A, 60B that are provided in parallel with the one-way clutch 50 in the weakly applied state and also keeping the first and second motors 2A, 2B and the rear wheels Wr in the connected state, even when the input of the forward torque from the first and second motors 2A, 2B is temporarily decreased, thereby putting the one-way clutch 50 in a disengaged state, it is possible to restrain the power transmission between the first and second motors 2A, 2B and the rear wheels Wr from being interrupted. A motor speed control is made unnecessary that would otherwise have to be carried out to put the first and second motors 2A, 2B and the rear wheels Wr in the connected state when the vehicle is shifted to a regenerative deceleration, which will be described later. The consumed energy that is consumed when the hydraulic brakes 60A, 60B are applied is reduced by making the application force of the hydraulic brakes 60A, 60B when the one-way clutch 50 is in the engaged state weaker than the application force of the hydraulic brakes 60A, 60B when the one-way clutch 50 is in the disengaged state.

Figure 7:
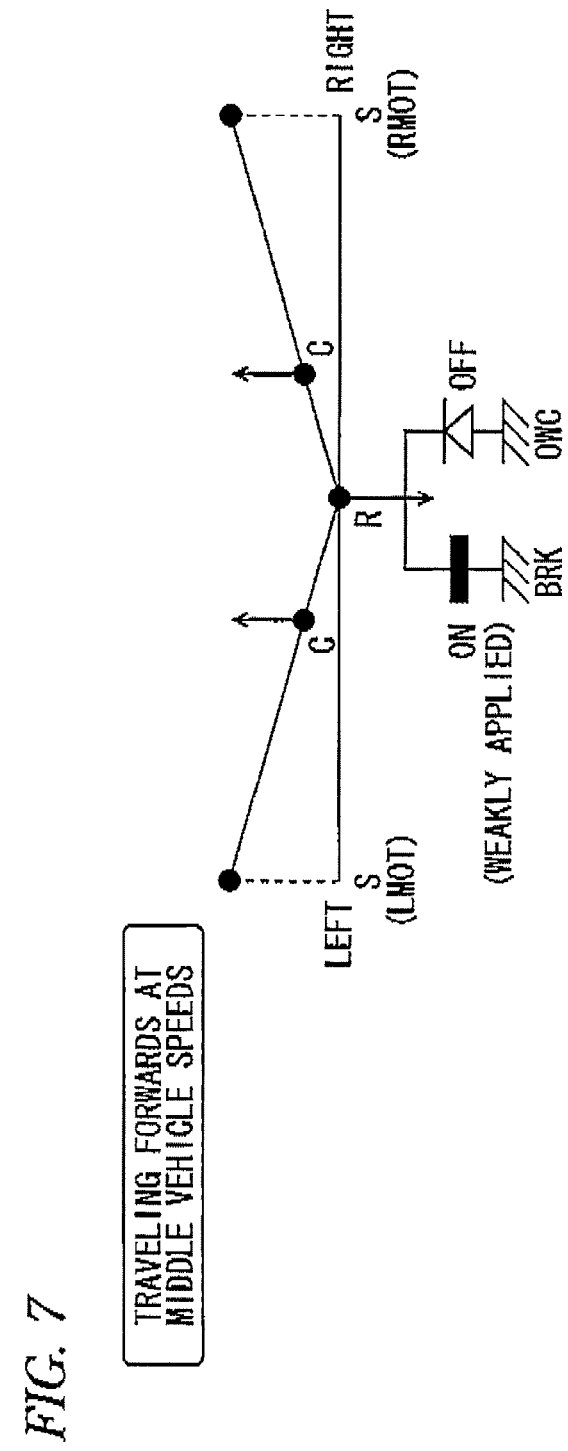
FIG. 7 is a speed collinear diagram of the rear-wheel drive system when the vehicle is traveling forwards at intermediate vehicle speeds.

When the vehicle speed is increased from the state where the vehicle is traveling forwards at low vehicle speeds, causing the vehicle to travel forwards at middle vehicle speeds where the engine efficiency is improved, the driving of the vehicle is shifted from the rear-wheel drive by the rear-wheel drive system 1 to the front-wheel drive by the front-wheel drive system 6. As shown in FIG. 7, when the power driving of the first and second motors 2A, 2B is stopped, forward torque attempting to drive the vehicle forwards is applied to the planetary carriers 23A, 23B from the axles 10A, 10B, and therefore, as described above, the one-way clutch 50 is put in the disengaged state. In this case, too, the hydraulic brakes 60A, 60B are controlled to be put in the weakly applied state.

Figure 8:
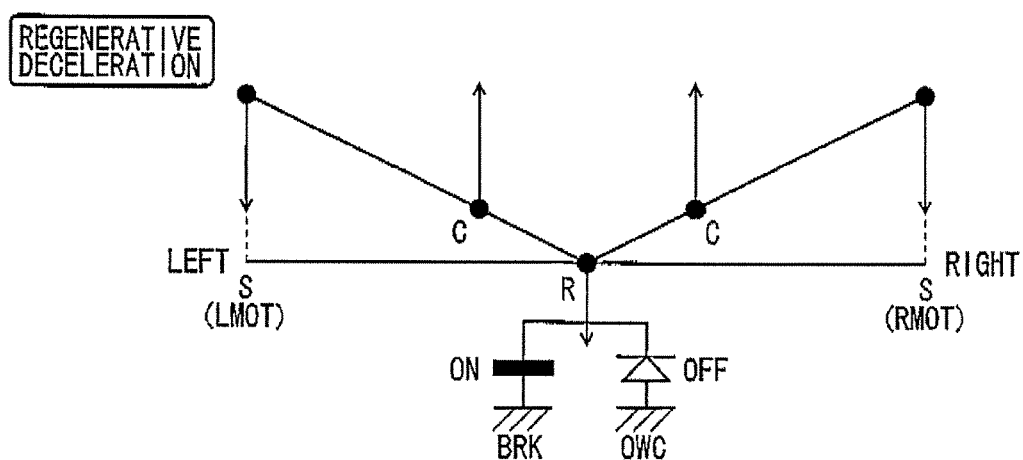
FIG. 8 is a speed collinear diagram of the rear-wheel drive system when the vehicle is decelerated for regeneration.

When the first and second motors 2A, 2B are attempted to be driven for regeneration from the state depicted in FIG. 6 or 7, as shown in FIG. 8, the forward torque attempting to keep the vehicle traveling forwards is applied to the planetary carriers 23A, 23B from the axles 10A, 10B. Therefore, as described above, the one-way clutch 50 is put in the disengaged state. As this occurs, the hydraulic brakes 60A, 60B are controlled to be put in the applied state (ON). Consequently, the ring gears 24A, 24B are fixed, and backward regenerative braking torque is applied to the first and second motors 2A, 2B, whereby a regenerative deceleration is executed by the first and second motors 2A, 2B. In this way, when the forward torque at the rear wheels Wr is inputted into the first and second motors 2A, 2B, the one-way clutch 50 is put in the disengage state, and it is not possible to transmit the power only by the one-way clutch 50. However, by causing the hydraulic brakes 60A, 60B that are provided in parallel with the one-way clutch 50 to be applied and keeping the first and second motors 2A, 2B and the rear wheels Wr in the connected state, a power transmissive state can be maintained between the first and second motors 2A, 2B and the rear wheels Wr. Then, by controlling the first and second motors 2A, 2B to be put in a regenerative drive state in this state, the energy of the vehicle 3 can be regenerated.

Next, when the vehicle is accelerated, the vehicle is driven through four-wheel drive involving the front-wheel drive system 6 and the rear-wheel drive system 1. Then, the rear-wheel drive system 1 is in the same state as the state depicted in FIG. 6 which results when the vehicle is traveling forwards at low vehicle speeds.

When the vehicle travels forwards at high vehicle speeds, the vehicle is driven through front-wheel drive by the front-wheel drive system 6. As this occurs, the control of the rear-wheel drive system 1 differs whether or not a request for a yawing moment is made. When no request for a yawing moment is made, the first and second motors 2A, 2B are stopped. On the other hand, when a request for a yawing moment is made, a left and right opposite torque control is executed in which the first and second motors 2A, 2B generate torque in opposite directions. The left and right opposite torque control will be described later, and here, a case will be described where no request for a yawing moment is made.

Figure 9:
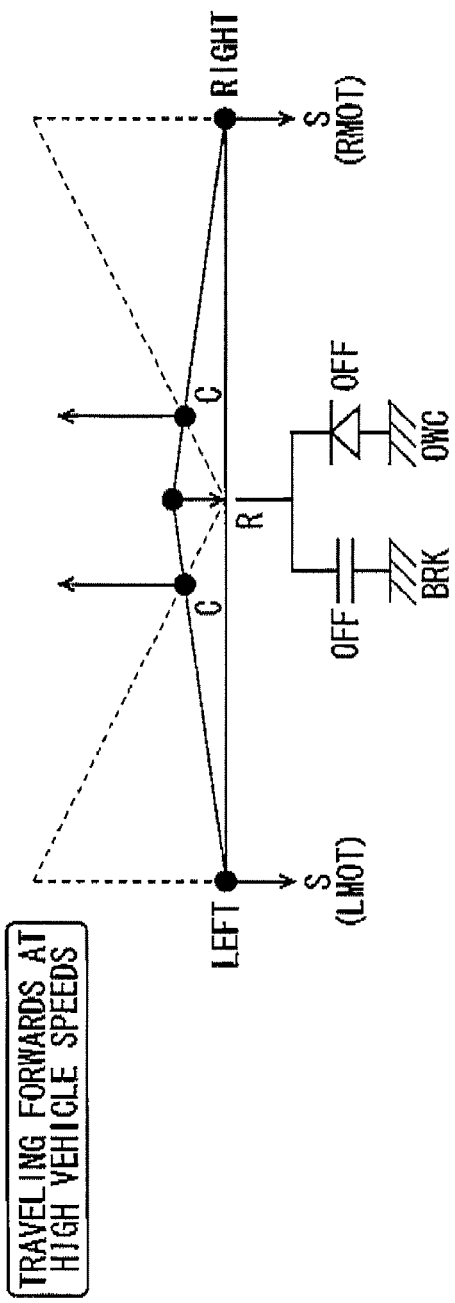
FIG. 9 is a speed collinear diagram of the rear-wheel drive system when the vehicle is traveling forwards at high vehicle speeds.

When there is made no request for a yawing moment, the first and second motors 2A, 2B are stopped. As shown in FIG. 9, when the power driving of the first and second motors 2A, 2B is stopped, the forward torque attempting to drive the vehicle forwards is applied to the planetary carriers 23A, 23B from the axles 10A, 10B. Therefore, as described above, the one-way clutch 50 is put in the disengaged state. As this occurs, rotational losses of the sun gears 21A, 21B and the first and second motors 2A, 2B are inputted into the sun gears 21A, 21B as resistance, and rotational losses of the ring gears 24A, 24B are produced in the ring gears 24A, 24B.

As this occurs, the hydraulic brakes 60A, 60B are controlled to be put in the released state (OFF). Consequently, the entrained rotation of the first and second motors 2A, 2B is prevented, whereby the over speed or revolution of the first and second motors 2A, 2*b* is prevented when the vehicle travels forwards at high vehicle speeds by the front-wheel drive system 6.

Figure 10:
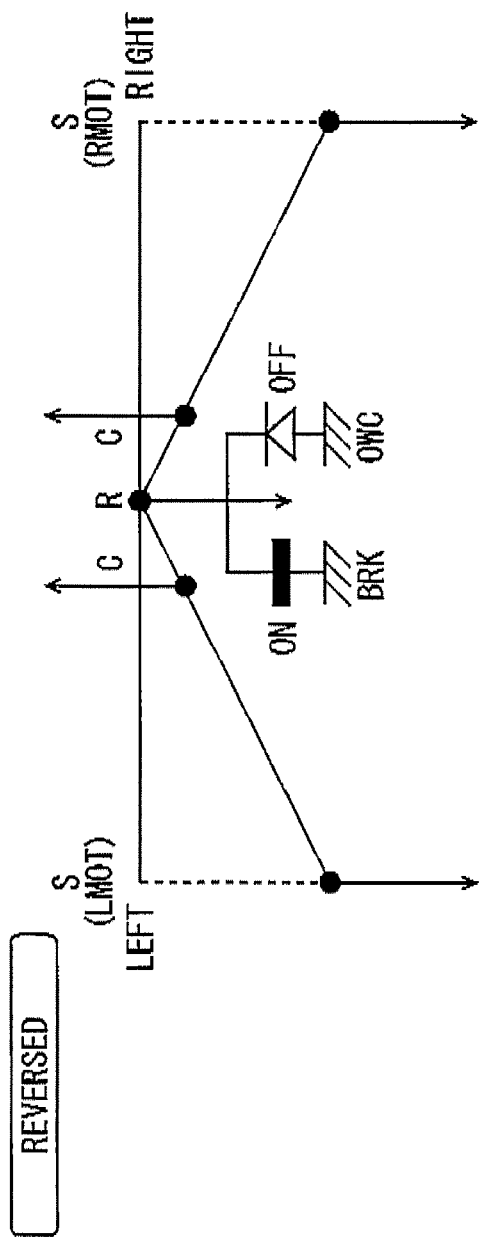
FIG. 10 is a speed collinear diagram of the rear-wheel drive system when the vehicle is reversed.

When the vehicle is reversed, as shown in FIG. 10, in the event that the first and second motors 2A, 2B are power driven backwards, backward torque is given to the sun gears 21A, 21B. As this occurs, the one-way clutch 50 is put in the disengaged state as described above.

As this occurs, the hydraulic brakes 60A, 60B are controlled to be put in the applied state. Consequently, the ring gears 24A, 24B are fixed in place, and the planetary carriers 23A, 23B are rotated backwards, whereby the vehicle is reversed. The running resistance is applied in the forward direction to the planetary carriers 23A, 23B from the axles 10A, 10B. In this way, when the backward torque at the first and second motors 2A, 2B is inputted into the rear wheels Wr, the one-way clutch 50 is put in the disengaged state, and it is not possible to transmit the power only by the one-way clutch 50. However, by causing the hydraulic brakes 60A, 60B that are provided in parallel with the one-way clutch 50 to be applied and keeping the first and second motors 2A, 2B and the rear wheels Wr in the connected state, a power transmissive state can be maintained between the first and second motors 2A, 2B and the rear wheels Wr, whereby the vehicle 3 can be reversed by the torque of the first and second motors 2A, 2B.

In this way, in the rear-wheel drive system 1, the application and release of the hydraulic motors 60A, 60B is controlled according to the driving states of the vehicle, in other words, according to in which direction the first and second motors 2A, 2B rotate; in the forward or backward direction, and from which the power is inputted; from the first and second motors 2A, 2B or the rear wheels Wr. Further, even when the hydraulic brakes 60A, 60B are in the applied state, the application force is adjusted.

Figure 11:
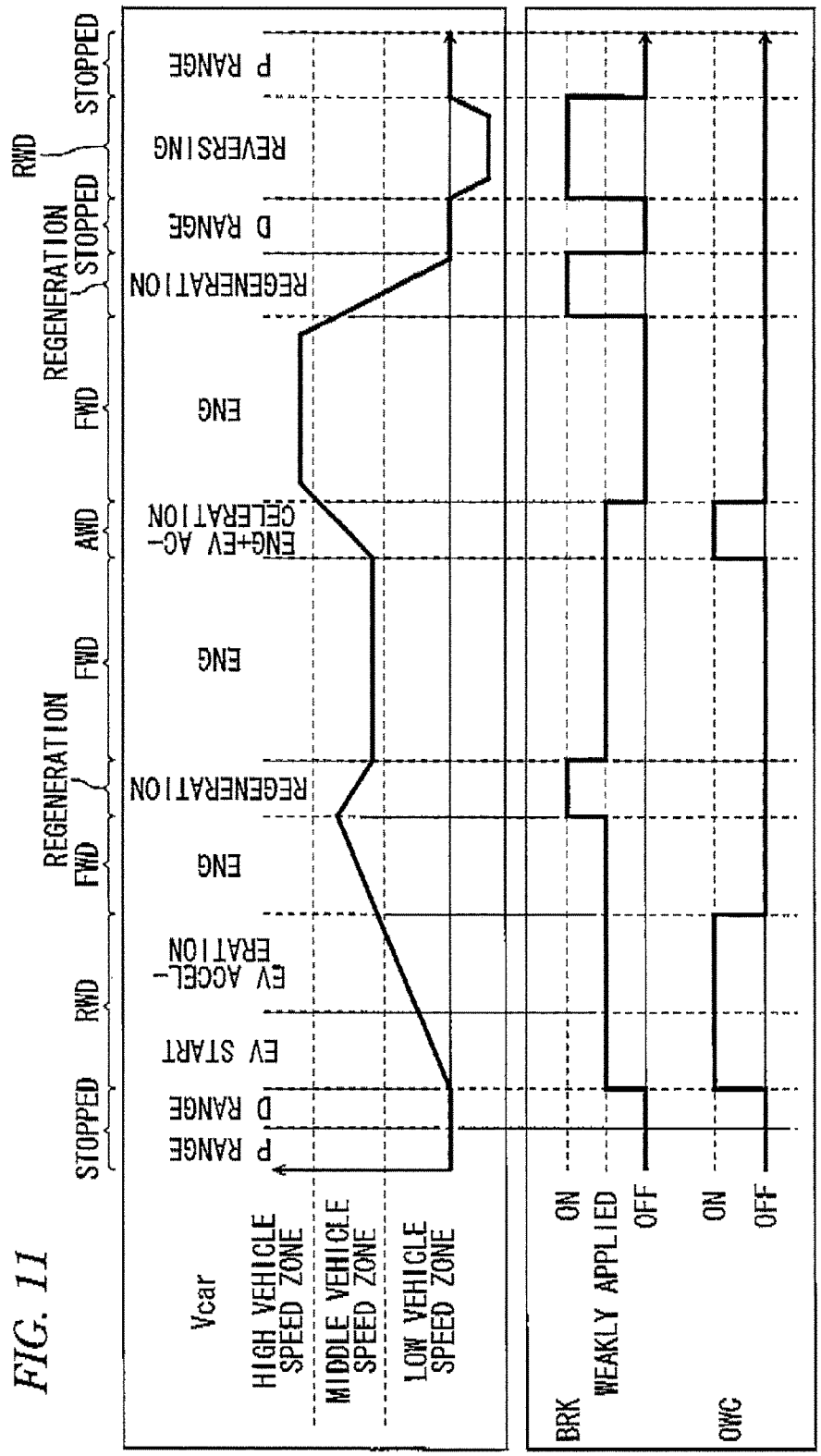
FIG. 11 is a timing chart while the vehicle is being driven.

FIG. 11 is a timing chart of the electric oil pump 70 (EOP), the one-way clutch 50 (OWC), and the hydraulic brakes 60A, 60B (BRK) from the time when the vehicle starts from a stopped state to the time when the vehicle stops again through events of EV start→EV acceleration→ENG acceleration→regenerative deceleration→middle-speed ENG cruising→ENG+EV acceleration→high-speed ENG cruising→regenerative deceleration→stop→reversing.

Firstly, the one-way clutch 50 is kept in the disengaged state (OFF) and the hydraulic brakes 60A, 60B are kept in the released state (OFF) until the key position is switched to the ON position, the gear is then shifted from the P range to the D range and the accelerator pedal is depressed. When the accelerator pedal is depressed in that state, EV start and EV acceleration are executed through rear-wheel drive (RWD) by the rear-wheel drive system 1. As this occurs, the one-way clutch 50 is engaged (ON), and the hydraulic brakes 60A, 60B are put in the weakly applied state. Then, when the vehicle speed is increased to reach a middle vehicle speed zone from a low vehicle speed zone and the driving of the vehicle is switched from rear wheel drive to front wheel drive, an ENG driving (FWD) by the internal combustion engine 4 is executed. As this occurs, the one-way clutch 50 is disengaged (OFF), while the hydraulic brakes 60A, 60B are kept in the same states as before (in the weakly applied state). Then, when a regenerative deceleration occurs in the vehicle with the brake pedal depressed, the hydraulic brakes 60A, 60B are applied (ON) while the one-way clutch 50 is kept disengaged (OFF). The same state as when the ENG driving is executed results while the middle speed cruising by the internal combustion engine 4 is executed. Next, when the accelerator pedal is depressed further to switch the driving of the vehicle from front wheel drive to four or all wheel drive (AWD), the one-way clutch 50 is engaged (ON) again. Then, when the vehicle speed reaches a high vehicle speed zone from the middle vehicle speed zone, the ENG driving (FWD) by the internal combustion engine 4 is executed again. As this occurs, the one-way clutch 50 is disengaged (OFF), and the hydraulic brakes 60A, 60B are released (OFF). As this occurs, when there is made no request for a yawing moment, the first and second motors 2A, 2B are stopped, whereas when there is made a request for a yawing moment, a left and right opposite torque control, which will be described later, is executed. Then, when the vehicle is decelerated for regeneration, the same state results as the state that resulted when the vehicle was decelerated for regeneration as described. Then, when the vehicle is stopped, the one-way clutch 50 is disengaged (OFF), and the hydraulic brakes 60A, 60B are released (OFF).

Next, when the vehicle is reversed, the hydraulic brakes 60A, 60B are applied (ON) while the one-way clutch 50 is kept disengaged (OFF). Then, when the vehicle is stopped, the one-way clutch 50 is disengaged (OFF), and the hydraulic brakes 60A, 60B are put in the released state (OFF).

Nets, the left and right opposite torque control will be described.

The left and right opposite torque control is a control in which one motor of the first motor 2A and the second motor 2B is controlled so as to produce a forward torque or backward torque and the other motor to produce a backward torque or forward torque that is opposite in direction to the torque produced by the one motor, and thus, the first motor 2A and the second motor 2B are controlled so as to produce the torque in the opposite directions. By so doing, it is possible to keep a yawing moment produced even under conditions in which the one-way clutch 50 is not engaged and the hydraulic brakes 60A, 60B are controlled to be kept in the released state, that is, even while the ring gears 24A, 24B are rotating. In the embodiments, a revolution matching is executed in this state by a manner (A) in which one motor of the first motor 2A and the second motor 2B is controlled based on a target speed of the one motor and the other motor is controlled based on a target torque of the other motor or a manner (B) in which both motors of the first motor 2A and the second motor 2B are controlled based on target torques of both the motors and a correction torque is added only to the one motor of the first motor 2A and the second motor 2B to cause the one motor to attain its target speed. Backward torque denotes torque applied in a direction in which the rotation in the backward direction is increased or torque applied in a direction in which the rotation in the forward direction is decreased.

In the following description, a case where either of the first and second motors 2A, 2B is controlled to attain an arbitrary target speed (hereinafter, referred to as a motor target speed) will be referred to as a first embodiment, a case where either of the first and second motors 2A, 2B is controlled to attain the motor target speed so that the ring gears 24A, 24B attain a ring gear target speed will be referred to as a second embodiment, and a case where either of the first and second motors 2A, 2B is controlled to attain the motor target speed based on the speed of the planetary gears 22A, 22B will be referred to as a third embodiment. In the first to third embodiments, while the motor speed (r/min) is used as a revolution state quantity, the revolution state quantity is not limited to the motor speed (r/min), and hence, other revolution state quantities such as an angular velocity (rad/s) may be used. Similarly, in the first to third embodiments, while the motor torque (N·m) is used as a torque state quantity, other torque state quantities such as a motor current (A) that is correlated with the motor torque may be used.

First Embodiment

Figure 12:
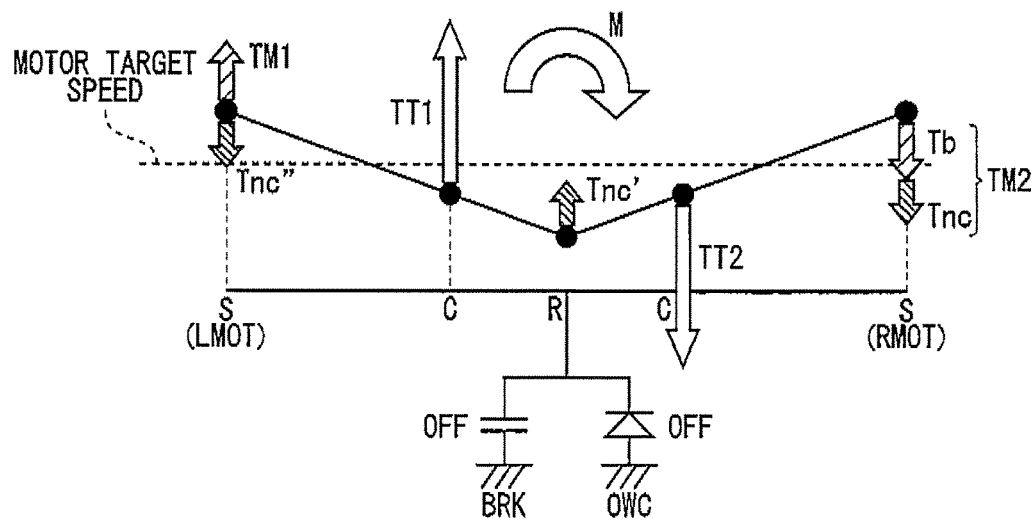
FIG. 12 is a speed collinear diagram of the rear-wheel drive system when a left and right opposite torque control according to a first embodiment is executed (before a target revolution is attained).

FIG. 12 is a speed collinear diagram of the rear-wheel drive system when a left and right opposite torque control is executed (before a target revolution is attained) while the vehicle is traveling forwards at high vehicle speeds. In the figure, vectors depicting losses that are normally generated in the individual rotational elements are omitted. While the vehicle is traveling forwards at high vehicle speeds, the vehicle is driven through front-wheel drive by the front-wheel drive system 6 as described above, and therefore, the one-way clutch 50 is disengaged. As this occurs, the hydraulic brakes 60A, 60B are controlled to be put in the released state. Consequently, the coupled ring gears 24A, 24B are allowed to rotate without being locked.

In this state, a torque control is executed on the first motor 2A based on the target torque so that a first motor torque TM1 in the forward direction is produced, and a speed control is executed on the second motor 2B based on the motor target speed so that a second motor torque TM2 in the backward direction is produced. An absolute value of the second motor torque TM2 is set to a larger value than an absolute value of the first motor torque TM1.

By executing the torque control on the first motor 2A based on the target torque so that the first motor torque TM1 in the forward direction is produced, the first motor torque TM1 in the forward direction acts on the sun gear 24A. As this occurs, as has happed in FIG. 9, forward torque (not shown) that attempts to drive the vehicle forwards is applied to the planetary carriers 23A, 23B from the axles 10A, 10B. Consequently, in the first epicyclic reduction gear 12A, the planetary gear 23A functions as a fulcrum, and the first motor torque M1 in the forward direction is applied to the sun gear 21A which functions as a point of application, whereby a first motor torque distributed force TM1' in the backward direction acts on the ring gears 24A, 24B which function as a point of action (refer to FIG. 13). In the second epicyclic reduction gear 12B, the planetary carrier 23B functions as a fulcrum, and the first motor torque distributed force TM1' in the backward direction is applied to the ring gears 24A, 24B which function as the point of application, whereby a first motor torque distributed force TM1" in the forward direction acts on the sun gear 21B which functions as a point of action (refer to FIG. 13).

On the other hand, by executing the speed control on the second motor 2B based on the motor target speed so that a speed control torque in the backward direction is produced, the second motor torque TM2 in the backward direction acts on the sun gear 21B. The second motor torque TM2 can be divided into a balancing torque Tb whose absolute value equals the absolute value of the first motor torque TM1 and which acts in the backward direction and a speed controlling torque Tnc in the backward direction which is the remaining of the second motor torque TM2. Consequently, in the second epicyclic reduction gear 12B, the planetary carrier 23B functions as a fulcrum, and the balancing torque Tb in the backward direction and the speed controlling torque Trio in the backward direction are applied to the sun gear 21B which functions as a point of application, whereby a balancing torque distributed force Tb' in the forward direction and a speed controlling torque Tnc' in the forward direction act on the ring gears 24A, 24B which function as a point of action (refer to FIGS. 12, 13). In the first epicyclic reduction gear 12A, the planetary carrier 23A functions as a fulcrum, and the balancing torque distributed force Tb' in the forward direction and the speed controlling torque Tnc' in the forward direction are applied to the ring gears 24A, 24B which function as a point of application, whereby a balancing torque distributed force Tb" in the backward direction and a speed control torque distributed force Tnc" in the backward direction act on the sun gear 21A which functions as a point of action (refer to FIGS. 12, 13).

Figure 13:
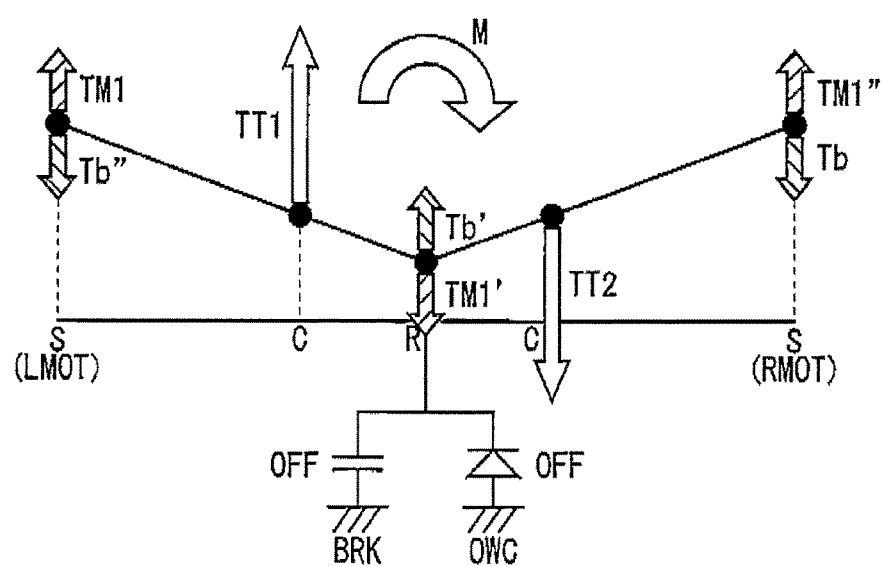
FIG. 13 is a speed collinear diagram of the rear-wheel drive system that depicts a balance between a first motor torque and a balancing torque of a second motor torque in FIG. 12.

Here, the first motor torque TM1 and the balancing torque Tb are opposite in direction and equal in magnitude (absolute values), and therefore, as shown in FIG. 13, the first motor torque TM1 in the forward direction and the balancing torque distributed force Tb" in the backward direction which both act on the sun gear 21A cancel each other, and the first motor torque distributed force TM1' in the backward direction and the balancing torque distributed force Tb' in the forward direction which both act on the ring gears 24A, 24B cancel each other, the first motor torque distributed force TM1" in the forward direction and the balancing torque Tb in the backward direction which both act on the sun gear 21B canceling each other. Consequently, the sun gears 21A, 21B and the ring gears 24A, 24B are allowed to balance so that their rotating states are maintained by the first motor torque TM1 and the balancing torque Tb. As this occurs, a carrier torque TT1 in the forward direction that is obtained by multiplying the first motor torque TM1 by a reduction ratio of the first epicyclic reduction gear 12A acts on the planetary carrier 23A, and a carrier torque TT2 in the backward direction that is obtained by multiplying the balancing torque Tb by a reduction ratio of the second epicyclic reduction gear 12B acts on the planetary carrier 23B.

Since the reduction ratios of the first and second epicyclic reduction gears 12A, 12B are equal, a clockwise yawing moment M is produced in a stable fashion by the carrier torques TT1, TT2.

On the other hand, due to there being basically no torque that balances them, the speed controlling torque Tnc and the speed controlling torque distributed force Tnc' and the speed controlling torque distributed force Tnc", which are distributed force of the speed controlling torque Tnc, are not outputted to the planetary carriers 23A, 23B and are consumed to change the speeds of the sun gears 21A, 21B and the ring gears 24A, 24B. In association with this, the speed controlling torque Tnc in the backward direction of the second motor torque TM2 that acts on the sun gear 21B and the speed controlling torque distributed force Tnc" in the backward direction that is the distributed force of the speed controlling torque Tnc and which acts on the sun gear 21A each decrease the speeds of the sun gears 21A, 21B, that is, the speeds of the first and second motors 2A, 2B, and the speed controlling torque distributed force Tnc' in the forward direction that acts on the ring gears 24A, 24B increases the speeds of the ring gears 24A, 24B. In the event that the speed controlling torque Tnc changes too drastically, a resistance force, not shown, that equals the inertia of the ring gears 24A, 24B functions to resist a reaction force and is outputted to the planetary carrier 23B, and therefore, the speed controlling torque Tnc is to be controlled so as not to change drastically.

In this way, in the left and right opposite torque control while the ring gears 24A, 24B are rotating, by executing the torque control on the first motor 2A based on the target torque so that the first motor torque TM1 in the forward direction is produced and executing the speed control on the second motor 2B based on the motor target speed so that the second motor torque TM2 in the backward direction is produced, the first motor torque TM1 and the balancing torque Tb of the second motor torque TM2 contribute to the production of a yawing moment M in the vehicle 3, and the speed controlling torque Tnc of the second motor torque TM2 contributes in allowing the speed of the second motor 2B to reach the motor target speed.

Figure 14:
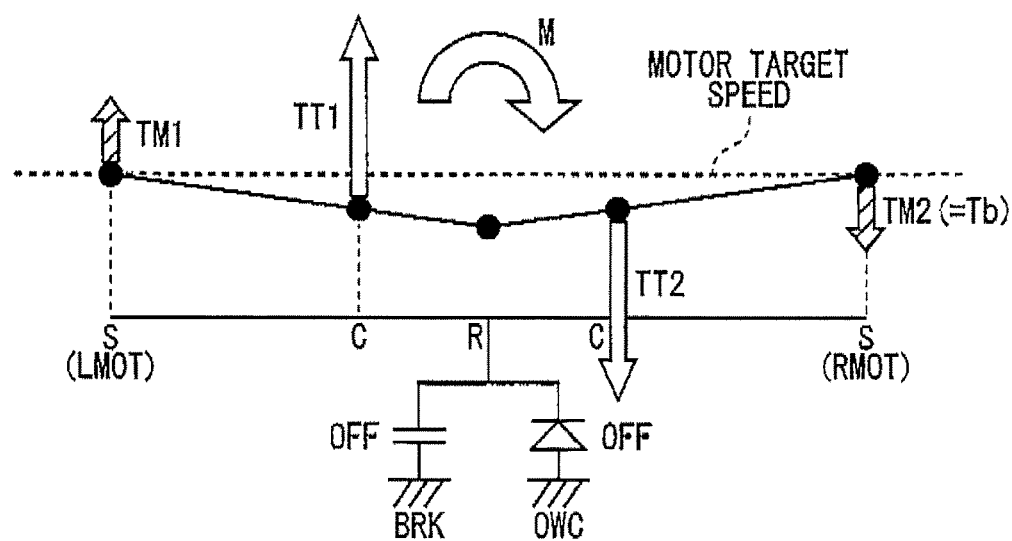
FIG. 14 is a speed collinear diagram of the rear-wheel drive system when the left and right opposite torque control according to the first embodiment is executed (after the target revolution is reached).

When the second motor 2B reaches the motor target speed, the second motor torque TM2 is made up only of the balancing torque Tb whose absolute value equals that of the first motor torque TM1 and which acts in the backward direction, which reduces the speed controlling torque Tnc. FIG. 14 is a speed collinear diagram of the rear-wheel drive system when the left and right opposite torque control according to the first embodiment is executed (after the target revolution is reached). By executing the left and right opposite torque control, the first motor torque TM1 balances the second motor Torque TM2 in such a state that the second motor 2B holds the motor target speed, and the clockwise yawing moment so produced is maintained.

In this left and right opposite torque control, in place of executing the torque control on the first motor 2A based on the target torque so that the first motor torque TM1 in the forward direction is produced and executing the speed control on the second motor 2B based on the motor target speed so that the second motor torque TM2 in the backward direction is produced, even in the event that both of the first motor 2A and the second motor 2B are controlled based on a target torque and a correction torque is added only to the second motor 2B to allow the second motor 2B to attain a target revolution state quantity, the same function can be attained. The following second and third embodiments will be described based on the latter controlling approach.

It is preferable to obtain a target torque in torque controlling the first motor 2A based on a target yawing moment of the vehicle 3. How to obtain the target torque will be described using the following expressions.

When a left rear wheel target torque of the left rear wheel LWr is referred to as WTT1, a right rear wheel target torque of the right rear wheel RWr is referred to as WTT2, a total target torque of the left and right rear wheels LWr, RWr (a sum of a left rear wheel torque and a right rear wheel torque) is referred to TRT, and a target torque difference of the left and right rear wheels LWr, RWr (a difference between the left rear wheel torque and the right rear wheel torque) is referred to as ΔTT, the following expressions (1), (2) are established.

$$WTT1+WTT2=TRT \tag{1}$$

$$WTT1-WTT2=\Delta TT \tag{2}$$

When a target yawing moment (a clockwise moment is referred to as positive) is referred to as YMT, a wheel radius is referred to as r, and a tread width (a distance between the left and right rear wheels LWr, RWr) is referred to as Tr, ΔTT is expressed by the following expression (3).

$$\Delta TT=2 \cdot r \cdot YMT/Tr \tag{3}$$

Here, the torque produced in the same direction by the first and second motors 2A, 2B is not transmitted in a longitudinal direction of the vehicle 3 while the ring gears 24A, 24B are rotating, and therefore, the total target torque TRT of the left and right rear wheels LWr, RWr is zero. Consequently, the target torques WTT1, WTT2 of the left and right rear wheels LWr, RWr are determined primarily from the expressions (1), (2) above.

$$\text{Namely, } WWT1=-WTT2=\Delta TT/2 \tag{4}$$

When the target torque of the first motor 2A that is coupled to the left rear wheel LWr is referred to as TTM1, the target torque TTM1 of the first motor 2A is calculated from the following expression (5).

$$TT_M1=(1/\text{Ratio}) \cdot WTT1 \tag{5}$$

where Ratio is the reduction ratio of the first and second epicyclic reduction gears 12A, 12B.

The target torque TTM1 of the first motor 2A is expressed by the following expression (6) from the expressions (4), (5).

$$TTM1=(1/\text{Ratio}) \cdot \Delta TT/2 \tag{6}$$

Consequently, the target torque difference ΔTT between the left and right rear wheels LWr, RWr is obtained based on the target yawing moment YMT of the vehicle 3, and a value obtained by dividing the torque that is half the target torque difference ΔTT by the reduction ratio of the first epicyclic reduction rear 12A is referred to as the target torque TTM1 of the first motor 2A on which the torque control is executed, whereby a desired yawing moment can be produced.

It is preferable that the motor target speed used in executing the speed control is obtained based on at least one of the efficiency of the second motor 2B and the efficiency of an electric power supply unit that supplies electric power to the second motor 2B. In such a state that the ring gears 24A, 24B are locked by the hydraulic brakes 60A, 60B and/or the one-way clutch 50, the speed of the first and second motors 2A, 2B is associated with the rotation of the planetary carriers 23A, 23B and becomes a predetermined speed that corresponds to the reduction ratio of the first and second epicyclic reduction gears 12A, 12B. However, in such a state that the ring gears 24A, 24B are not locked, that is, when the ring gears 24A, 24B are rotating, the speed of the first and second motors 2A, 2B is not associated with the rotation of the planetary carriers 23A, 23B and can be an arbitrary speed. The electric power supply unit is made up of a PDU, not shown, which includes an inverter or a three-phase wire and is mainly made up of a PDU. By obtaining the motor target speed based on the efficiency of the second motor 2B and the efficiency of the PDU which occupy a large portion of the efficiency of an electric power supply system, it is possible to reduce the consumed electric power further. On the other hand, the motor target speed may also be obtained based only on the efficiency of the second motor 2B. When the motor target speed is obtained in an experimental fashion, the preparation of an efficiency map is facilitated, and when the motor target speed is obtained through sequential detection and estimation, it is possible to reduce the control quantity.

In the embodiment, the pattern is described in which the motor target speed of the second motor 2B is lower than an actual speed thereof (hereinafter, referred to as a motor actual speed) and the clockwise yawing moment is produced. However, in reality, the electric motor on which the torque control is to be executed and the electric motor on which the speed control is to be executed are determined based on whether the motor target speed is higher or lower than the motor actual speed and whether the target yawing moment is clockwise or counterclockwise.

Figure 15:
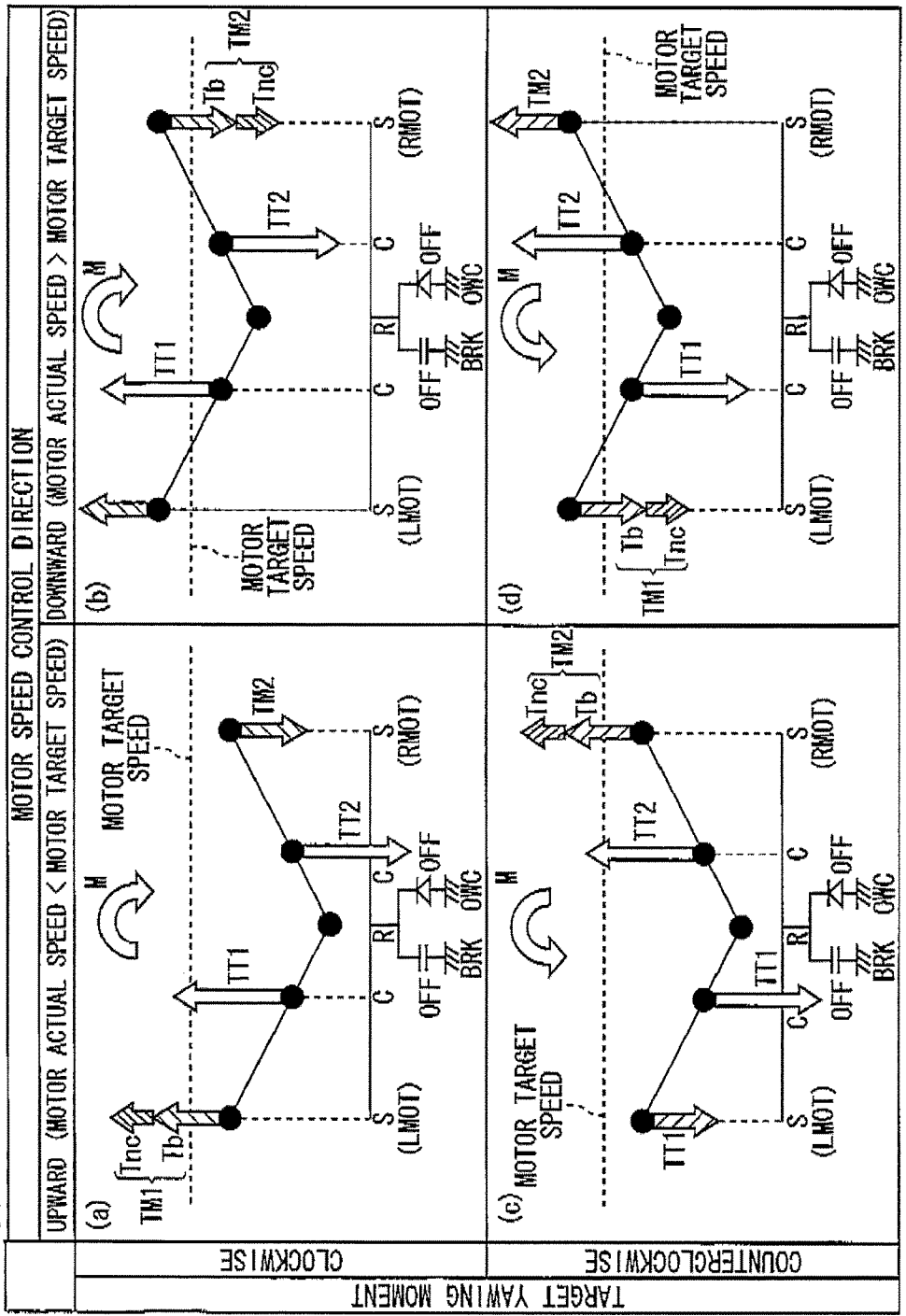
FIG. 15 is a diagram depicting four patterns of the left and right opposite torque control of the first embodiment.
Figure 19:
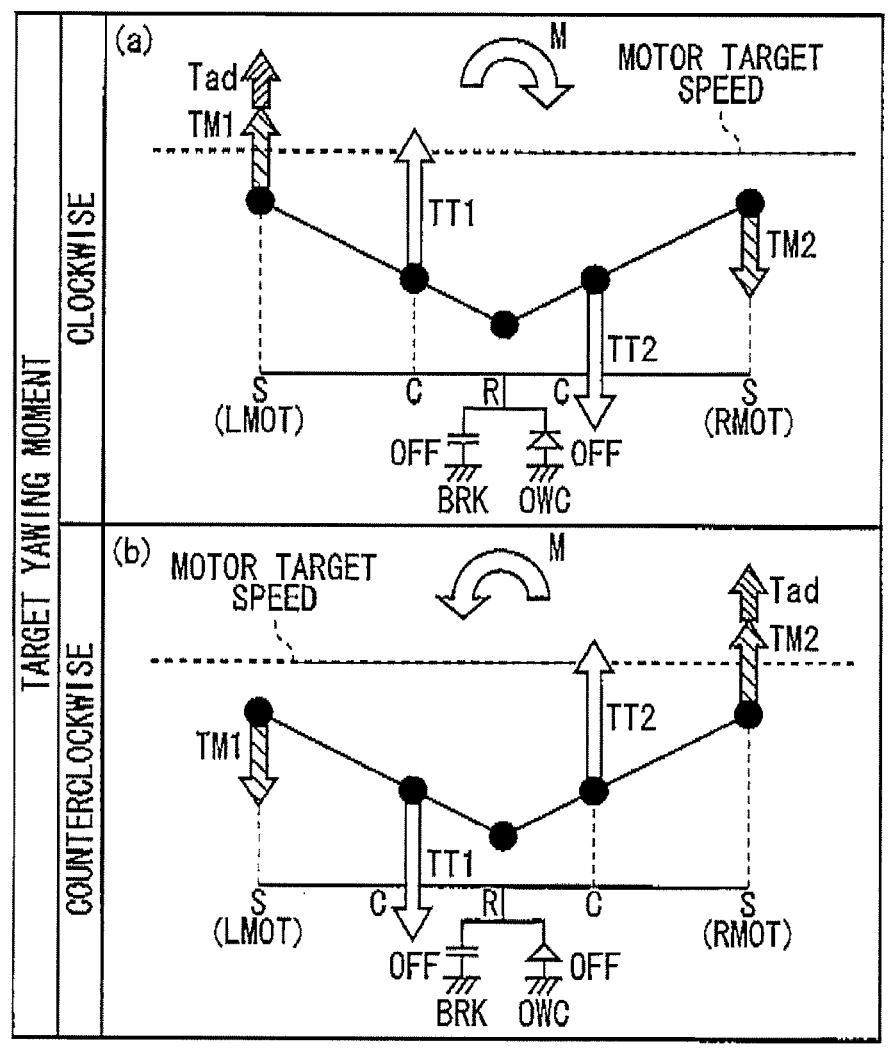
FIG. 19 is a diagram depicting two patterns of the left and right opposite torque control according to the second embodiment.

As shown at (a) in FIG. 15, when the target yawing moment is clockwise, and the motor actual speed is smaller than the motor target speed (motor actual speed<motor target speed) and hence, the motor actual speed is increased (motor speed controlling direction: upward), the first motor 2A is speed controlled so as to produce forward torque, and the second motor 2B is torque controlled so as to produce backward torque. As shown at (b), when the target yawing moment is clockwise, and the motor actual speed is larger than the motor target speed (motor actual speed>motor target speed) and hence, the motor actual speed is decreased (motor speed controlling direction: downward), the second motor 2B is speed controlled so as to produce backward torque and the first motor 2A is torque controlled so as to produce forward torque (the pattern of the embodiment).

On the other hand, as shown at (c), when the target yawing moment is counterclockwise, and the motor actual speed is smaller than the target motor speed (motor actual supped<motor target speed) and hence, the motor actual speed is increased (motor speed controlling direction:

upward), the second motor 2B is speed controlled so as to produce forward torque and the first motor 2A is torque controlled so as to produce backward torque. As shown at (d), when the target yawing moment is counterclockwise, and the motor actual speed is larger than the motor target speed (motor actual speed>motor target speed) and hence, the motor actual speed is decreased (motor speed controlling direction: downward), the first motor 2A is speed controlled so as to produce backward torque so as to produce and the second motor 2B is torque controlled so as to produce forward torque.

Next, a flow of the left and right opposite torque control according to the first embodiment will be described by reference to FIG. 16.

Firstly, when a command to execute the left and right opposite control is issued, commands to obtain a motor target speed, a motor actual speed and a target yawing moment are acquired (S11). Next, the target yawing moment command is coded based on the target yawing moment obtained, and the motor speed controlling direction is coded based on the motor target speed and the motor actual speed that are so obtained (S12).

In coding, as shown in FIG. 17, if the target yawing moment is clockwise, the target yawing moment command is signed as "positive" and if the target yawing moment is counterclockwise, the target yawing moment command is signed as "negative." If the motor actual speed is smaller than the motor target speed (motor actual speed>motor target speed) and hence, the motor actual speed is increased, the motor speed controlling direction is signed as "positive" and if the motor actual speed is larger than the motor target speed (motor actual speed>motor target speed) and hence, the motor actual speed is decreased, the motor speed controlling direction is signed as "negative."

Next, the coded target yawing moment command sign is multiplied by the coded motor speed controlling direction sign to obtain a control selection sign (S13). A control selection sign obtained by multiplying "positive" by "positive" or multiplying "negative" by "negative" is referred to as "positive," whereas a control selection sign obtained by multiplying "positive" by "negative" and multiplying "negative" by "positive," is referred to as "negative."

As a result, it is detected whether or not the control selection sign is "positive" (S14), and if the control selection sign is "positive," the first motor 2A is speed controlled (S15), and the second motor 2B is torque controlled (S16). On the other hand, if the control selection sign is "negative," the first motor 2A is torque controlled (S17), whereas the second motor 2B is speed controlled (S18).

Thus, as described above, when the left and right opposite torque control is executed while the coupled ring gears 24A, 24B are rotating, one motor of the first motor 2A and the second motor 2B is controlled based on the target speed of the one motor, and the other motor is controlled based on the target torque of the other motor, whereby it is possible to control the one motor to attain the motor target speed while satisfying the target yawing moment even in a state where the ring gears 24A, 24B are allowed to rotate freely without being fixed by the hydraulic brakes 60A, 60B and the one-way clutch 50. By setting the motor target speed based on the efficiency of the one motor, it is possible to realize energy saving and an improvement in fuel economy.

Second Embodiment

Next, a left and right opposite torque control according to a second embodiment will be described.

The left and right opposite torque control of this embodiment is a control in which the first and second motors 2A, 2B are controlled so that the ring gears 24A, 24B attain their ring gear target speed. In the following description, a configuration will be described as an example in which a correction torque is added to the second motor 2B so that the ring gears 24A, 24B are put in a zero rotation state for application of the hydraulic brakes 60A, 60B, whereby the first and second motors 2A, 2B are allowed to attain the motor target speed.

As described in FIG. 9, when the vehicle travels forwards at high vehicle speeds, the power driving of the first and second motors 2A, 2B is stopped, whereby forward torque that attempts to drive the vehicle forwards is applied to the planetary carriers 23A, 23B from the axles 10A, 10B, and the one-way clutch 50 is put in the disengaged state. When the target yawing moment command in the backward direction is inputted in this state, as shown in FIG. 18(a), the torque control is executed on the first motor 2A based on the target torque so that a first motor torque TM1 in the backward direction is produced, and the torque control is executed on the second motor 2B so that a second motor torque TM2 in the forward torque is produced that is equal in magnitude to and which is opposite in direction to the first motor torque TM1.

Consequently, as described in FIG. 13, there results a state where the first motor torque TM1 balances the second motor torque TM2. As this occurs, a carrier torque TT1 in the background direction that is obtained by multiplying the first motor torque TM1 in the backward direction by the reduction ratio of the first epicyclic reduction gear 12A is applied to the planetary carrier 23A, while a carrier torque TT2 in the forward direction that is obtained by multiplying the second motor torque TM2 in the forward direction by the reduction ratio of the second epicyclic reduction gear 12B is applied to the planetary carrier 23B, whereby a counterclockwise yawing moment is produced by the carrier torques TT1, TT2.

When a command to apply the hydraulic brakes 60A, 60B is issued in this state, the ring gear target speed of the ring gears 24A, 24B is set to zero so as to apply the hydraulic brakes 60A, 60B, and in order to reduce the rotation of the ring gears 24A, 24B to zero, as shown in FIG. 18(b), a correction torque Tad in the forward direction is added further to the second motor 2B that is producing the forward torque. As this occurs, in the second epicyclic reduction gear 12B, the planetary carrier 23B functions as a fulcrum, and the correction torque Tad in the forward direction is applied to the sun gear 21B which functions as a point of application, whereby a correction torque distributed force Tad' in the backward direction acts on the ring gears 24A, 24B which function as a point of action. In the first epicyclic reduction gear 12A, the planetary carrier 23A functions as a fulcrum, and the correction torque distributed force Tad' in the backward direction is applied to the ring gears 24A, 24B which function as a point of application, whereby a correction torque distributed force Tad" in the forward direction acts on the sun gear 21A which functions as a point of action. Due to there being basically no torque that balances them, the correction torque Tad and the correction torque distributed force Tad' and the correction torque distributed force Tad", which are distributed force of the correction torque Tad, are not outputted to the planetary carriers 23A, 23B and are consumed to change the speeds of the sun gears 21A, 21B and the ring gears 24A, 24B. In association with this, the correction torque Tad and the correction torque distributed force Tad" increase the speeds of the ring gears 24A, 24B, that is, the speeds of the first and second motors 2A, 2B, respectively, while the correction torque distributed force Tad' in the backward direction which acts on the ring gears 24A, 24B decreases the speed of the ring gears 24A, 24B. By so doing, the speed of the second motor 2B eventually becomes the motor target speed, and the speed of the ring gears 24A, 24B eventually becomes substantially zero which is the ring gear target speed.

Then, when the speed of the ring gears 24A, 24B becomes substantially zero, as shown in FIG. 18(c), the hydraulic brakes 60A, 60B are applied, and the correction torque Tad is removed. By so doing, the absolute values of the first motor torque TM1 and the second motor torque TM2 become equal, whereby the counterclockwise yawing moment M that is being produced is maintained. Further, by applying the hydraulic brakes 60A, 60B to slow the ring gears 24A, 24B, it becomes possible to transmit the torque produced in the same direction by the first and second motors 2A, 2B to the wheels.

It is preferable that the target torque used in executing the torque control is obtained based on the target yawing moment. How to obtain this target torque is similar to that described in the first embodiment. When the target torque of the first motor 2A which is connected to the left rear wheel LWr is referred to as TTM1' and the target torque of the second motor 2B which is connected to the right rear wheel RWr is referred to as TTM2', the target torques TTM1', TTM2' of the first and second motors 2A, 2B which are disposed left and right are calculated from the following expressions (5)', (7).

$$TTM1'=(1/Ratio) \cdot WTT1 \quad (5)'$$

$$TTM2'=(1/Ratio) \cdot WTT2 \quad (7)$$

where, Ratio is the reduction ratio of the first and second epicyclic reduction gears 12A, 12B.

The first target motor torque TTM1' and the second target motor torque TTM2' are expressed by the following expressions (6)', (8) from the expressions (4), (5)', (7).

$$TTM1'=(1/Ratio) \cdot \Delta TT/2 \quad (6)'$$

$$TTM2'=-(1/Ratio) \cdot \Delta TT/2 \quad (8)$$

Consequently, a target torque difference ΔTT between the first motor 2A and the second motor 2B is obtained based on the target yawing moment YMT of the vehicle 3, and values obtained by dividing a torque that is half the target torque difference ΔTT by the reduction radio of the first and second epicyclic reduction gears 12A, 12B are controlled as the target torques of the first motor 2A and the second motor 2B, whereby it is possible to produce a desired yawing moment.

In the embodiment, the pattern (FIG. 19(b)) to produce the counterclockwise yawing moment is described. However, in order to produce a clockwise yawing moment, as shown in FIG. 19(a), the torque control is executed on the first motor 2A based on the target torque so that a first motor torque TM1 in the forward direction is produced, and the torque control is executed on the second motor 2B so that a second motor torque TM2 in the backward direction is produced that is equal in magnitude to and which is opposite in direction to the first motor torque TM1. A correction torque Tad that contributes to the speed control is added to the first motor 2A. Thus, the production of the clockwise yawing moment is realized. Namely, in order to decrease the speed of the ring gears 24A, 24B, the speed of the motors needs to be increased, and therefore, the correction torque needs to be added to the motor that is producing the forward torque. By so doing, it becomes possible to transmit the target torque to the rear wheels Wr at all times, whereby the yawing moment of the vehicle 3 remains unchanged, the behaviors of the vehicle 3 being thereby stabilized.

In the embodiment, the case is described where the target speed of the ring gears 24A, 24B is set to zero for application of the hydraulic brakes 60A, 60B. However, a similar control is also possible when the ring gear target speed of the ring gears 24A, 24B is set to zero for engagement of the one-way clutch 50. Further, when both a command to apply the hydraulic brakes 60A, 60B and a command to engage the one-way clutch 50 are not issued, the ring gear target speed of the ring gears 24A, 24B may be set so that the ring gears 24A, 24B rotate in the forward direction and are put in a substantially zero state. By adopting this configuration, it is possible to put the ring gears 24A, 24B in a rotating state where the rotational loss of the ring gears 24A, 24B is small with the one-way clutch 50 disengaged. By setting the one-way clutch 50 so as not to be engaged, it is possible to avoid a risk of a shock being transmitted to the wheels Wr as a result of the engagement of the one-way clutch 50, thereby making it possible to suppress the shock.

Figure 20:
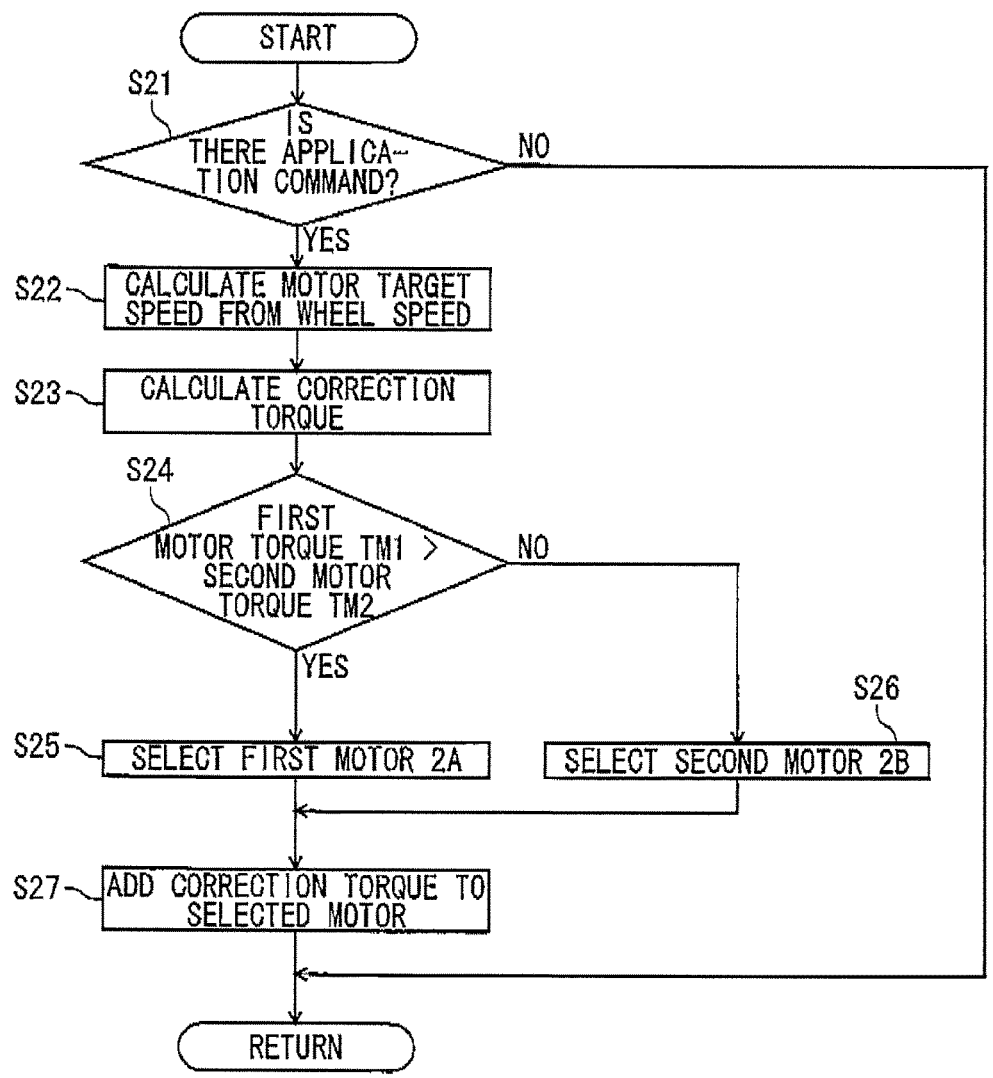
FIG. 20 is a flowchart depicting a flow of the left and right opposite torque control according to the second embodiment.
Figure 22:
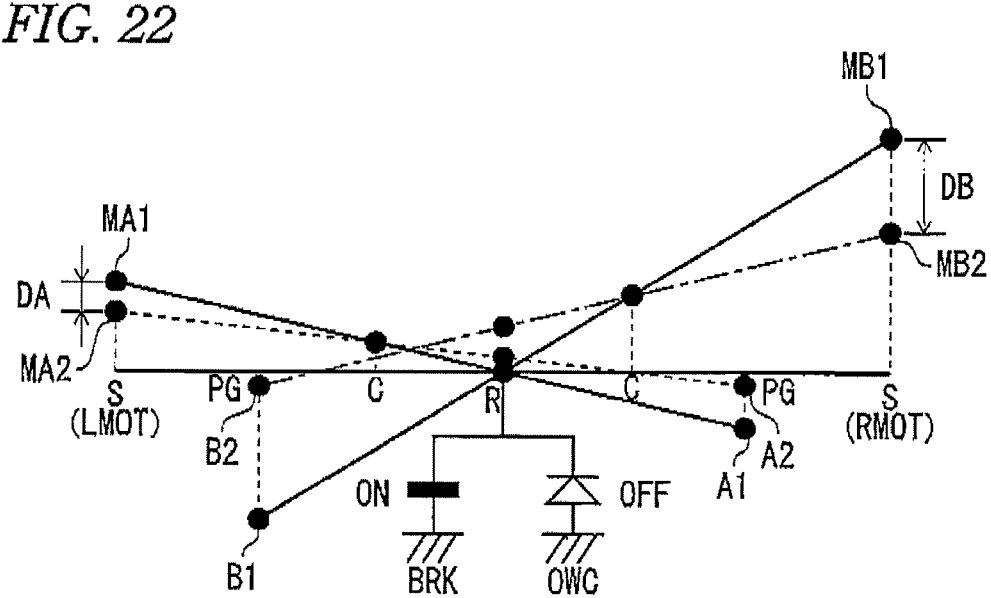
FIG. 22 is a diagram depicting a speed difference in a first motor and a speed difference in a second motor.

Next, a flow of the left and right opposite torque control of the second embodiment will be described by reference to FIG. 20.

By executing the left and right opposite torque control while the ring gears 24A, 24B are rotating, in such a state that the yawing moment is continuously produced (FIG. 18(a)), firstly, it is detected whether or not there exists a command to apply the hydraulic brakes 60A, 60B (S21). If it is determined as a result of the detection that there exists no such application command, the controlling process ends there.

If it is determined that there exists such application command, a motor target speed is calculated from a wheel speed (S22). This is intended to detect a motor target speed of the first motor 2A and the second motor 2B at which the rotation of the ring gears 24A, 24B becomes zero in anticipation of a case where the hydraulic brakes 60A, 60B are applied. Next, a correction torque is calculated according to a rotation difference between the motor target speed and an actual motor speed (S23). Next, it is determined whether or not the torque of the first motor 2A is larger than the torque of the second motor 2B, that is, whether or not the first motor torque TM1 is a torque in the forward direction (S24). While the left and right opposite torque control is being executed, in the event that one motor is producing forward torque, the other motor is producing backward torque. Thus, in order to decrease the rotation of the ring gears 24A, 24B while maintaining the yawing moment M, the correction torque needs to be added to the motor that is producing the forward torque.

If it is determined as a result of the detection that the first motor torque TM1 is larger than the second motor torque TM2, that is, the first motor torque TM1 is the forward torque, the first motor 2A is selected (S25). On the other hand, if it is determined that the first motor torque TM1 is smaller than the second motor torque TM2, that is, the second motor torque TM2 is the forward torque, the second motor 2B is selected (S26). Next, the correction torque is added to either of the motors that was selected in S25 or S26 (S27).

By so doing, the hydraulic brakes 60A, 60B can be applied in such a state that the speed of the ring gears 24A, 24B is decreased to substantially zero. In this way, by applying the hydraulic brakes 60A, 60B in such a state that the speed of the ring gears 24A, 24B is decreased to substantially zero, it is possible to reduce the deterioration of the hydraulic brakes 60A, 60B. Then, even before the ring gears 24A, 24B are locked, the first motor torque TM1 balances the second motor torque TM2, thereby it is possible to produce a yawing moment.

The target speed of the first and second motors 2A, 2B may be obtained based on the speed of the planetary carriers 23A, 23B or the speed of the left wheel LWr or the right wheel RWr in addition to the ring gear target speed of the ring gears 24A, 24B. By so doing, it is possible to control the rotation of the ring gears 24A, 24B with greater accuracy.

Thus, as described above, when the left and right opposite torque control is executed while the coupled ring gears 24A, 24B are rotating, both the first motor 2A and the second motor 2B are controlled based on the target torque of both the motors, and the motor target speed of the first motor 2A and the second motor 2B is obtained based on the ring gear target speed. Then, the correction torque to allow the motors to attain the motor target speed is added only to one motor of the motors. Thus, it is possible to control the one motor to attain the motor target speed while satisfying the target yawing moment even in the state where the ring gears 24A, 24B are allowed to rotate freely without being fixed by the hydraulic brakes 60A, 60B and the one-way clutch 50. Then, the motor target speed is set so that the rotation of the ring gear target speed becomes substantially zero, whereby the hydraulic brakes 60A, 60B are allowed to be applied when the rotation of the ring gears 24A, 24B becomes substantially zero, thereby making it possible to reduce the shock produced when the hydraulic brakes 60A, 60B are applied and the deterioration thereof.

Third Embodiment

Next, a left and right opposite torque control according to a third embodiment will be described.

The left and right opposite torque control of this embodiment is a control in which the first and second motors 2A, 2B are controlled so that one of the planetary gears 22A, 22B is allowed to attain a planetary gear target speed. In the following description, a configuration will be described as an example in which a correction torque is added to the first motor 2A so that the rotating direction of the planetary gears 22A, 22B is not reversed so as to prevent a backlash that would otherwise be produced by the reversing of the rotating direction of the planetary gears 22A, 22B.

FIG. 21(a) is a speed collinear diagram of the rear-wheel drive system while the vehicle 3 is turning to the left. In the rear-wheel drive system 1, in order to assist the vehicle 3 in turning to the left, the torque control is executed on the first motor 2A based on the target torque so that a first motor torque TM1 in the backward direction is produced, and the torque control is executed on the second motor 2B so that a second motor torque TM2 in the forward direction is produced that is equal in magnitude to and which is opposite in direction to the first motor torque TM1.

As this occurs, a carrier torque TT1 in the backward direction that is obtained by multiplying the first motor torque TM1 in the backward direction by the reduction ratio of the first epicyclic reduction gear 12A is applied to the planetary carrier 23A, while a carrier torque TTM2 in the forward direction that is obtained by multiplying the second motor torque TM2 in the forward direction by the reduction ratio of the second epicyclic reduction gear 12B is applied to the planetary carrier 23B, whereby a counterclockwise yawing moment M is produced by the carrier torques TT1, TT2. Since the vehicle 3 is turning to the left, the speeds of the sun gear 21B and the planetary carrier 23B of the second epicyclic reduction gear 12B becomes larger those of the sun gear 21A and the planetary carrier 23A of the first epicyclic reduction gear 12A according to a difference in rotation between the left rear wheel LWr and the right rear wheel RWr.

In FIG. 21(a), a point (A1) on an extension that is extended further from a collinear diagram that connects together the sun gear 21A (S), the planetary carrier 23A (C), and the ring gear 24A (R) of the first epicyclic reduction gear 12A denotes the speed (of rotation on its own axis) of the planetary gear 22A (PG), and a point (B1) on an extension that is extended further from a collinear diagram that connects together the sun gear 21B (S), the planetary carrier 23B (C), and the ring gear 24B (R) denotes the speed (of rotation on its own axis) of the planetary gear 22B (PG).

When the hydraulic brakes 60A, 60B are released from this state, it is possible to allow the sun gears 21A, 21B (S) and the planetary gears 22A, 22B (PG) and the ring gears 24A, 24B (R) other than the planetary carriers 23A, 23B (C) that are connected to the left rear wheel LWr and the right rear wheel RWr, respectively, to rotate in an arbitrary fashion. Here, when a command to release the hydraulic brakes 60A, 60B is issued, a planetary gear target speed A2 is set near to the zero rotation so that the rotating direction of the planetary gear 22A that is rotating backwards is not reversed and that the speed (the absolute value) is reduced to a small level, and a speed difference DA between a motor actual speed MA1 of the first motor 2A and a motor target speed MA2 of the first motor 2A that is obtained based on the planetary gear target speed A2 and the speed of the planetary carrier 23A is calculated (refer to FIG. 22). Similarly, a planetary gear target speed B2 is set near to the zero rotation so that the rotating direction of the planetary gear 22B that is rotating backwards is not reversed and that the speed (the absolute value) is reduced to a small level, and a speed difference DB between a motor actual speed MB1 of the second motor 2B and a motor target speed MB2 of the second motor 2B that is obtained based on the planetary gear target speed B2 and the speed of the planetary carrier 23B is calculated (refer to FIG. 22). The speed difference DA at the first motor 2A is compared with the speed difference DB at the second motor 2B, and the first motor 2A whose speed difference is small is determined as the motor to which the correction torque is added, that is, as the motor having the motor target speed.

Next, as shown in FIG. 21(b), the hydraulic brakes 60A, 60B are released, and a correction torque Tad in the backward direction is added further to the first motor 2A that is determined as the motor having the motor target speed. As this occurs, in the first epicyclic reduction gear 12A, the planetary carrier 23A functions as a fulcrum, and the correction torque Tad in the backward direction is applied to the sun gear 21A which functions as a point of application, whereby a correction torque distributed force Tad' acts on the ring gears 24A, 24B which function as a point of action. In the second epicyclic reduction gear 12B, the planetary carrier 23B functions as a fulcrum, and the correction torque Tad' in the forward direction is applied to the ring gears 24A, 24B which function as a point of application, whereby a correction torque distributed force Tad" in the backward direction acts on the sun gear 21B which functions as a point of action. Due to there being basically no torque that balances them, the correction torque Tad and the correction torque distributed force Tad' and the correction torque distributed force Tad", which are distributed force of the correction torque Tad, are not outputted to the planetary carriers 23A, 23B and are consumed to change the speeds of the sun gears 21A, 21B and the ring gears 24A, 24B. In association with this, the correction torque Tad and the correction torque distributed force Tad" decrease the speeds of the sun gears 21A, 21B, that is, the speeds of the first and second motors 2A, 2B, respectively, and the correction torque distributed force Tad' in the forward direction which acts on the ring gears 24A, 24B increases the speeds of the ring gears 24A, 24B and the planetary gear 22A. By so doing, the speed of the first motor 2A eventually becomes the motor target speed MA2, and the speed of the planetary gear 22A eventually becomes the planetary gear target speed A2.

The speed of the sun gear 22B, that is, the speed of the second motor 2B is determined primarily by the speed of the planetary carrier 23B which is coupled to the right rear wheel RWr and the speed of the ring gears 24A, 24B. When the speed difference DA at the first motor 2A differs from the speed difference DB at the second motor 2B, the speed of the second motor 2B does not constitute the motor target speed MB2.

Then, when the speed of the planetary gear 22A reaches the target planetary speed A2, as shown in FIG. 21(c), the correction torque Tad is removed. By so doing, the absolute values of the first motor torque TM1 and the second motor torque TM2 become equal to each other again, whereby the counterclockwise yawing moment M that is being produced is maintained.

It is preferable that the target torque used in executing the torque control is obtained based on the target yawing moment, and how to obtain this target torque is similar to that of the second embodiment, and therefore, the description thereof will be omitted here.

Next, a flow of the left and right opposite torque control according to the third embodiment will be described by reference to FIG. 23.

By executing the left and right opposite torque control in such a state that the hydraulic brakes 60A, 60B are applied, firstly, it is detected in such a state that the yawing moment is produced continuously (FIG. 21(a)) whether or not there exists a command to release the hydraulic brakes 60A, 60B (S31). If it is determined as a result of the detection that there exists no such release command, the controlling process ends there.

If it is determined that there exists such a release command, the motor actual speed MA1 of the first motor 2A and the motor actual speed MB1 of the second motor 2B are obtained (S32). Next, the planetary gear target speed A2 is set near to the zero rotation so that the rotating direction of the planetary gear 22A that is rotating is not reversed, and a motor target speed MA2 of the first motor 2A then is calculated. Similarly, the planetary gear target speed B2 is set near to the zero rotation so that the rotating direction of the planetary gear 22B that is rotating is not reversed, and a motor target speed MB2 of the second motor 2B then is calculated (S33).

A speed difference DA between the motor actual speed MA1 of the first motor 2A and the motor target speed MA2 of the first motor 2A that were detected or calculated in S32 and S33 is calculated. Similarly, a speed difference DB between the motor actual speed MB1 of the second motor 2B and the motor target speed MB2 of the second motor 2B is calculated (S34).

Next, it is detected whether or not the speed difference DA of the first motor 2A is smaller than the speed difference DB of the second motor 2B (S35). If it is determined in step S35 that the speed difference DA of the first motor 2A is smaller than the speed difference DB of the second motor 2B, the first motor 2A is selected (S36), whereas if it is determined in step S35 that the speed difference DA of the first motor 2A is larger than the speed difference DB of the second motor 2B, the second motor 2B is selected (S37). In this way, by selecting the motor having the smaller speed difference as the motor to which the correction torque is to be added, that is, as the motor having the motor target speed, it is possible to restrain the motor to which the correction torque is not added, that is, the motor that does not have the motor target speed from being controlled excessively. Should the second motor 2B which is the motor having the larger speed difference be selected as the motor to which the correction torque is to be added, that is, the motor having the motor target speed, the rotating direction of the planetary gear 22A of the first epicyclic reduction gear 12A is reversed, whereby the planetary gear 22A is caused to rotate forwards.

As described above, by adding the correction torque to the motor having the smaller speed difference, there occurs no such situation that the rotating directions of the planetary gears 22A, 22B of the first and second epicyclic reduction gears 12A, 12B are reversed, whereby it is possible to prevent the occurrence of a backlash, thereby making it possible to prevent, in turn, a disturbance in torque that would otherwise be produced in the rear wheels Wr by the backlash produced.

The calculation of the motor target speed in the third embodiment may be executed in parallel with the calculation of the motor target speed in the first embodiment. Namely, the calculation of the motor target speed based on the planetary gear target speed may be executed in parallel with the calculation of the motor target speed based on the efficiencies of the motors and the electric power supply unit that supplies electric power to the motors. By adopting this approach, the consumed electric power can be reduced while preventing the occurrence of a backlash. However, in case there exists no motor speed that satisfies at the same time the motor target speed that is obtained based on the planetary gear target speed and the motor target speed that is obtained based on the efficiencies of the motors and the electric power supply unit that supplies electric power to the motors, it is preferable that the motor target speed that is obtained based on the planetary gear target speed should take priority over the motor target speed that is obtained based on the efficiencies of the motors and the electric power supply unit that supplies electric power to the motors. By so doing, the prevention of the occurrence of a backlash is allowed to take priority over the efficiencies of the motors, thereby making it possible to improve the comfortableness in the vehicle.

The calculation of the motor target speed in the third embodiment may be executed in parallel with the calculation of the motor target speed in the second embodiment. Namely, the calculation of the motor target speed based on the planetary gear target speed may be executed in parallel with the calculation of the motor target speed based on the ring gear target speed. By adopting this approach, it is possible to prevent a shock that would be produced when the hydraulic brakes 60A, 60B are applied or released while preventing the occurrence of a backlash. However, in case there exists no motor speed that satisfies at the same time the motor target speed that is obtained based on the planetary gear target speed and the motor target speed that is obtained based on the ring gear target speed, it is preferable that the motor target speed that is obtained based on the ring gear target speed should take priority over the motor target speed that is obtained based on the planetary gear target speed. By so doing, the prevention of the shock that would be produced when the hydraulic brakes 60A, 60B are applied or released is allowed to take priority over the occurrence of a backlash, thereby making it possible to increase the stability of the vehicle.

Thus, as described above, when the left and right opposite torque control is executed, both the motors of the first motor 2A and the second motor 2B are controlled based on the target torque of both the motors, and the motor target speed of the one motor of the first motor 2A and the second motor 2B is obtained based on the target speed of the planetary gears 22A, 22B. Then, the correction torque to allow the motors to attain the motor target speed is added only to the one motor. Thus, it is possible to control the one motor to attain the motor target speed while satisfying the target yawing moment even in the state where the ring gears 24A, 24B are allowed to rotate freely without being fixed by the hydraulic brakes 60A, 60B and the one-way clutch 50. Then, the motor target speed is set so that the rotating direction of the planetary gears 22A, 22B that are rotating is not reversed, thereby making it possible to prevent a disturbance in torque that would otherwise be produced in the rear wheels Wr by the backlash produced.

The above embodiments do not limit but just exemplify the invention. The embodiments can be variously modified or improved.

For example, the hydraulic brakes 60A, 60B do not have to be provided individually for the ring gears 24A, 24B, and hence, at least one hydraulic brake and at least one one-way clutch should be provided on the coupled ring gears 24A, 24B. Either or both of the hydraulic brake and the one-way clutch may be omitted.

Although the hydraulic brakes are exemplified as the connection/disconnection unit, mechanical or electromagnetic brakes can also be selected, for example.

Although the first and second motors 2A, 2B are connected to the sun gears 21A, 21B, respectively, and the ring gears are coupled together, in the embodiments, the sun gears may be coupled together, and the first and second motors may be connected to the ring gears.

The front-wheel drive system may be such that the motor is used as a single drive source without using the internal combustion engine.

The invention claimed is:

1. A vehicle drive system, including:
a left-wheel drive unit having a first motor for driving a left wheel of a vehicle and a first transmission that is provided on a power transmission line between the first motor and the left wheel;
a right-wheel drive unit having a second motor for driving a right wheel of the vehicle and a second transmission that is provided on a power transmission line between the second motor and the right wheel; and
a motor control unit for controlling the first motor and the second motor,
wherein the first and second transmissions each has a first to third rotational elements,
wherein the first motor is connected to the first rotational element of the first transmission, wherein the second motor is connected to the first rotational element of the second transmission,
wherein the left wheel is connected to the second rotational element of the first transmission,
wherein the right wheel is connected to the second rotational element of the second transmission,
wherein the third rotational element of the first transmission and the third rotational element of the second transmission are coupled to each other,
wherein the first and second transmissions each further has a fourth rotational element which are supported so as to revolve around by the second rotational element while meshing with the first rotational element and the third rotational element, wherein the motor control unit is configured to:
perform at least one of first control and second control, the first control including controlling the first motor based on a first target revolution state quantity of the first transmission which is induced so that a rotating direction of the fourth rotational element of the first transmission rotating in one direction or another direction is not reversed, the second control including controlling the second motor based on a second target revolution state quantity of the second transmission which is induced so that a rotating direction of the fourth rotational element of the second transmission rotating in one direction or a other direction is not reversed, and
thereby control the first motor and the second motor so as not to reverse at least one of the rotating direction of the fourth rotational element of the first transmission and the rotating direction of the fourth rotational element of the second transmissions wherein there is further provided a connection/disconnection unit that can be released or applied and which slows a rotation of the third rotational elements by being applied, and wherein the motor control unit controls the first motor and the second motor further based on a target revolution state quantity of the coupled third rotational elements.

2. The system of claim 1,
wherein, when the connection/disconnection unit is released, the target rotation state quantity of the third rotational elements is set to a value for causing a state of the third rotational elements to transit to a zero rotation state, and then the connection/disconnection unit is applied when the third rotational elements are put in the zero rotation state.

3. The system of claim 1,
wherein there is further provided a rotational-direction restriction unit that permits a rotation of the third rotational elements in one direction based on backward torque of the first and second motors when disengaged, and which restricts a rotation of the third rotational elements in an other direction based on forward torque of the first and second motors when engaged, and
wherein the motor control unit controls the first motor and the second motor so that the rotating direction of the fourth rotation element rotating in the one direction is not reversed as a result of non-engagement of the rotational-direction restriction unit.

4. The system of claim 3,
wherein the motor control unit controls the first motor and the second motor so that the third rotational elements are put in a substantially zero rotation state rotating in the one direction as a result of non-engagement of the rotational-direction restriction unit.

5. The system of claim 3,
wherein the first and second transmissions are planetary gear mechanisms, and
wherein the first rotational elements are sun gears, the second rotational elements are carriers, the third rotational elements are ring gears, and the fourth rotational elements are planetary gears.

6. The system of claim 1, wherein the motor control unit is configured to:
control the first motor based on the first target revolution state quantity of the first transmission which is induced so that the rotating direction of the fourth rotational element of the first transmission rotating in the one direction or the other direction is not reversed, control the second motor based on the second target revolution state quantity of the second transmission which is induced so that the rotating direction of the fourth rotational element of the second transmission rotating in the one direction or the other direction is not reversed, and control the first motor and the second motor such that the rotating direction of the fourth rotational element of the first transmission and the rotating direction of the fourth rotational element of the second transmission are not reversed by satisfying either one of the first target revolution state quantity and the second target revolution state quantity if both of them cannot be satisfied.

* * * * *